United States Patent
Kobayashi et al.

(10) Patent No.: US 7,420,887 B2
(45) Date of Patent: Sep. 2, 2008

(54) OPTICAL STORAGE APPARATUS, METHOD FOR REGENERATION FROM OPTICAL STORAGE MEDIUM, AND METHOD FOR RECORDING ON OPTICAL STORAGE MEDIUM

(75) Inventors: Shinya Kobayashi, Kawasaki (JP); Masaaki Iwasaki, Kawasaki (JP)

(73) Assignee: Fujitsu Limited, Kawasaki (JP)

( * ) Notice: Subject to any disclaimer, the term of this patent is extended or adjusted under 35 U.S.C. 154(b) by 882 days.

(21) Appl. No.: 10/956,618

(22) Filed: Oct. 1, 2004

(65) Prior Publication Data
US 2005/0111310 A1 May 26, 2005

(30) Foreign Application Priority Data
Oct. 6, 2003 (JP) .............................. 2003-346570

(51) Int. Cl.
G11B 11/00 (2006.01)
(52) U.S. Cl. ................. 369/13.26; 369/13.27; 369/47.5; 369/13.14

(58) Field of Classification Search .............. 369/13.14, 369/13.27, 13.26, 47.5–47.53
See application file for complete search history.

(56) References Cited
FOREIGN PATENT DOCUMENTS
JP 2000-182292 6/2000

*Primary Examiner*—William Korzuch
*Assistant Examiner*—Kezhen Shen
(74) *Attorney, Agent, or Firm*—Greer, Burns & Crain, Ltd.

(57) ABSTRACT

If regeneration is not performed normally when data is regenerated from a medium, a read retry processing unit changes the intensities of the laser beam and of the regeneration magnetic field respectively to prearranged stages to perform the regeneration again. A regeneration condition change unit remembers the regeneration sector number for one read command from the higher order. When retry occurs, the regeneration condition change unit counts the number of the sectors for each stage which can be regenerated at each stage, and by providing a coefficient for each stage in advance, changes the default regeneration condition using the sum of products of the coefficients and the number of the counted regenerable sectors.

18 Claims, 20 Drawing Sheets

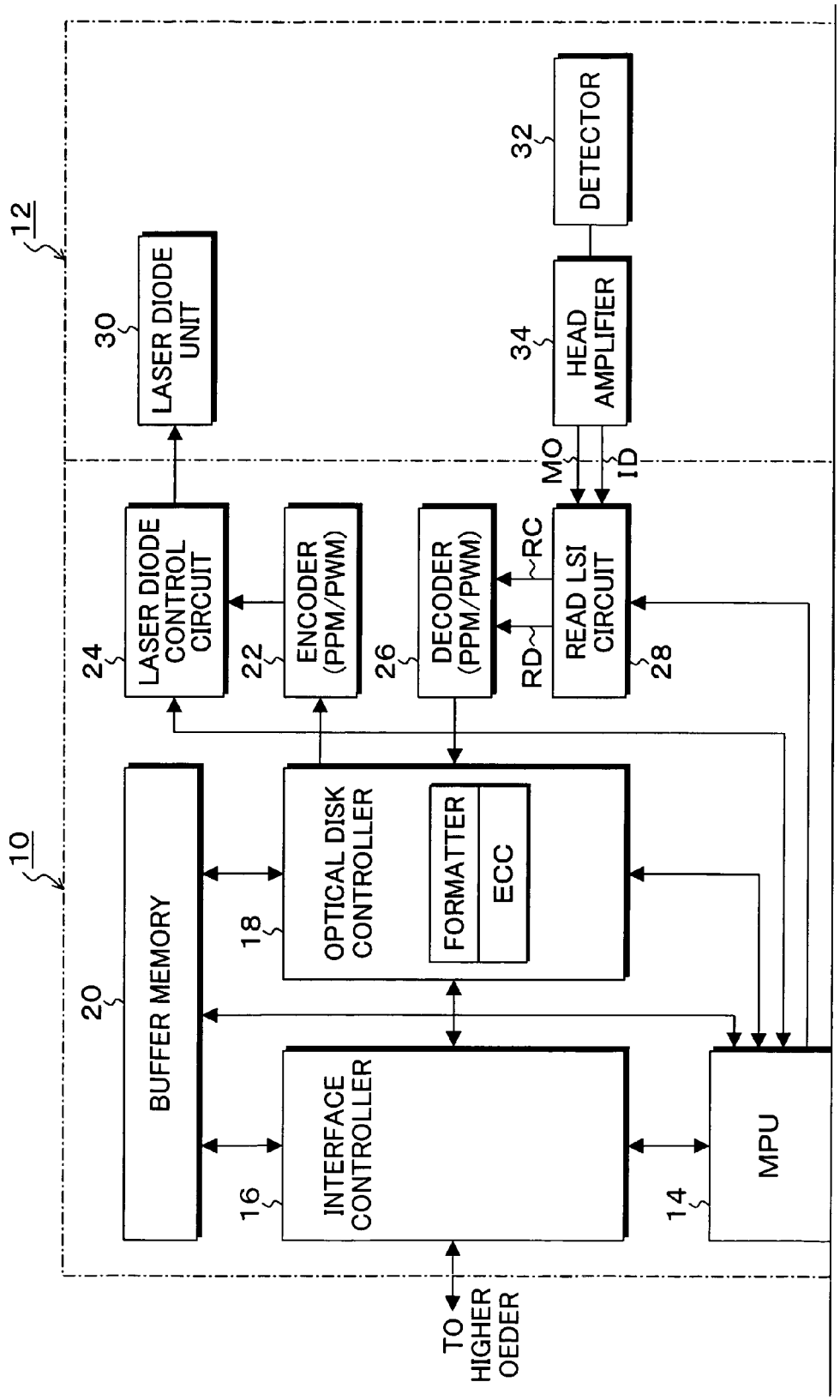

FIG. 7

| READ RETRY MODE | SUCCESSFUL SECTOR NUMBER | PROCESSED SECTOR NUMBER | RETRY CONTENTS | COEFFICIENT |
|---|---|---|---|---|
| MODE 0 | 0 | 1 | NO CONDITION CHANGE | −1 |
| MODE 1 | 3 | 4 | REGENERATION POWER UP | +1000 |
| MODE 2 | 7 | 7 | REGENERATION POWER DOWN | −1000 |

FIG. 8A

| READ RETRY MODE | SUCCESSFUL SECTOR NUMBER | RETRY CONTENTS | COEFFICIENT | PRODUCT | COUNTER VALUE |
|---|---|---|---|---|---|
| MODE 0 | 0 | NO CONDITION CHANGE | -1 | 0 | 0 |
| MODE 1 | 3 | REGENERATION POWER UP | +1000 | +3000 | +3000 |
| MODE 2 | 7 | REGENERATION POWER DOWN | -1000 | -7000 | -4000 |

FIG. 8B

| READ RETRY MODE | SUCCESSFUL SECTOR NUMBER | RETRY CONTENTS | COEFFICIENT | PRODUCT | COUNTER VALUE |
|---|---|---|---|---|---|
| MODE 0 | 0 | NO CONDITION CHANGE | -1 | 0 | -4000 |
| MODE 1 | 3 | REGENERATION POWER UP | +1000 | +3000 | -1000 |
| MODE 2 | 7 | REGENERATION POWER DOWN | -1000 | -7000 | -8000 |

FIG. 11

| VERIFY RETRY MODE | SUCCESSFUL SECTOR NUMBER | PROCESSED SECTOR NUMBER | RETRY CONTENTS | COEFFICIENT |
|---|---|---|---|---|
| MODE 0 | 0 | 10 | NO CONDITION CHANGE | −1 |
| MODE 1 | 3 | 10 | REGENERATION POWER UP | +1000 |
| MODE 2 | 7 | 7 | REGENERATION POWER DOWN | −1000 |

FIG. 12

| VERIFY RETRY MODE | SUCCESSFUL SECTOR NUMBER | RETRY CONTENTS | COEFFICIENT | PRODUCT | COUNTER VALUE |
|---|---|---|---|---|---|
| MODE 1 | 3 | REGENERATION POWER UP | +1000 | +3000 | +3000 |
| MODE 2 | 7 | REGENERATION POWER DOWN | −1000 | −7000 | −4000 |
| MODE 0 | 0 | NO CONDITION CHANGE | −1 | 0 | −4000 |

FIG. 14

| WRITE RETRY MODE | SUCCESSFUL SECTOR NUMBER | PROCESSED SECTOR NUMBER | RETRY CONTENTS | COEFFICIENT |
|---|---|---|---|---|
| MODE 0 | 0 | 10 | NO CONDITION CHANGE | -1 |
| MODE 1 | 3 | 10 | REGENERATION POWER UP | +1000 |
| MODE 2 | 7 | 7 | REGENERATION POWER DOWN | -1000 |

FIG. 15

| WRITE RETRY MODE | SUCCESSFUL SECTOR NUMBER | RETRY CONTENTS | COEFFICIENT | PRODUCT | COUNTER VALUE |
|---|---|---|---|---|---|
| MODE 1 | 3 | REGENERATION POWER UP | +1000 | +3000 | +3000 |
| MODE 2 | 7 | REGENERATION POWER DOWN | −1000 | −7000 | −4000 |
| MODE 0 | 0 | NO CONDITION CHANGE | −1 | 0 | −4000 |

OPTICAL STORAGE APPARATUS, METHOD FOR REGENERATION FROM OPTICAL STORAGE MEDIUM, AND METHOD FOR RECORDING ON OPTICAL STORAGE MEDIUM

BACKGROUND OF THE INVENTION

1. Field of the Invention

The present invention relates generally to an optical storage apparatus, a method for storage and regeneration from an optical storage medium and a method for recording on the optical storage medium, which record and regenerate information by use of laser beams, and more particularly, to an optical storage apparatus, a method for storage and regeneration from an optical storage medium and a method of recording on the optical storage medium, which optimize recording and regeneration conditions from retry operations in the case where errors occur in recording and regeneration operations of an optical storage medium including an MSR medium for recording and regenerating data with a smaller density than a beam diameter.

2. Description of the Related Arts

In a process of a conventional optical recording and regeneration apparatus for executing a read command from a host, when a plurality of sectors are processed by one (1) read command for normal termination, a retry setting is learned at the time of termination to change default conditions. In this case, a target of the learning is a retry setting when the last sector is processed. In other words, a read learning is performed when the read command is completed; a counter is controlled by the last successful mode; a regeneration power and a regeneration magnetic field are learned; and regeneration conditions are optimized.

FIGS. 1A, 1B and 1C are flowcharts of conventional a read command process which consists of following process procedures.

Step S1: A read command received from a host is decoded and a read operation is executed.

Step S2: It is checked whether the read operation failed or not, and if failed, the process proceeds to step S3; and otherwise, the process proceeds to step S6.

Step S3: It is checked whether the number of the read retry exceeds a predetermined number or not. If the number does not exceed the predetermined number, the process proceeds to step S4; and otherwise, the process proceeds to step S5.

Step S4: The number of the read retry is updated; a read condition is changed; and the process returns to the read execution in step S1 to execute a retry read. For changing the read condition, the change is performed by alternatively adding sequentially increasing positive and negative offsets to a default value of read power, and if the change still does not succeed, the change is performed by alternatively adding sequentially increasing positive and negative offsets to a default value of a regeneration magnetic field.

Step S5: This procedure is the case where the predetermined number of the retry is exceeded resulting in retry out, and an error report is issued to higher order as a defective sector operation.

Step S6: This procedure is the case where the retry succeeds, and it is checked whether the last successful retry mode has contents for changing read power or not. If the retry mode has contents for changing the read power, the process proceeds to step S7; and otherwise, the process proceeds to step S13 of FIG. 1B.

Step S7: It is checked whether, at the time of the successful retry, a read power setting is power up or not. If the setting is power up, the process proceeds to step S8; and otherwise, the process proceeds to step S9.

Step S8: A regeneration power learning counter is updated.

Step S9: It is checked whether, at the time of the successful retry, a read power setting is power down or not. If the setting is power down, the process proceeds to step S10; and otherwise, the process proceeds to step S11.

Step S10: A regeneration power learning counter is updated.

Step S11: It is checked whether the counter exceeds a threshold or not. If exceeding, the process proceeds to step S12: and otherwise, the process is terminated.

Step S12: This procedure is the case that the counter exceeds a threshold, and by learning the read power which is a regeneration condition of the last retry process, a default or previous regeneration condition is changed to the optimized condition determined by the learning. For example, if the regeneration condition of the last retry process is to up the read power, the default read power is increased by predefined value.

Step S13: It is checked whether a regeneration magnetic field of the last successful retry mode has contents which change a setting or not. If the regeneration magnetic field has contents which change a setting, the process proceeds to step S14; and otherwise, the process is terminated.

Step S14: It is checked whether, at the time of the successful retry, a regeneration magnetic field setting is up or not. If the setting is up, the process proceeds to step S15; and otherwise, the process proceeds to step S16.

Step S15: A regeneration magnetic field learning counter is updated.

Step S16: It is checked whether, at the time of the successful retry, a regeneration magnetic field setting is down or not. If the setting is down, the process proceeds to step S17; and otherwise, the process proceeds to step S18.

Step S17: A regeneration magnetic field learning counter is updated.

Step S18: It is checked whether the counter exceeds a threshold or not. If exceeding, the process proceeds to step S19; and otherwise, the process is terminated.

Step S19: This procedure is the case that the counter exceeds a threshold, and by learning the regeneration magnetic field which is a regeneration condition of the last retry process, a default or previous regeneration condition is changed to the optimized condition determined by the learning. For example, if the regeneration condition of the last retry process is to down the regeneration magnetic field, the default regeneration magnetic field is decreased by predefined value.

On the other hand, in a process of a conventional optical storage and regeneration apparatus for executing a write command, an erase, a write and a verify read are executed as processes for one (1) write command, and if operations are normally terminated by executing the write or the verify read, the write power learning and the read learning (regeneration power, regeneration magnetic field learning) with the write verify are performed as the learning for the write command when execution of the write command is completed. For the read learning with the write verify and the read learning with the read command of FIG. 1A, although learned parameters are the same regeneration power and regeneration magnetic field, the learning is executed at different timings.

FIG. 2 is a flowchart of a conventional write command process which consists of following process procedures.

Step S1: An erase operation is executed for a write target sector based on a write command issued from a host.

Step S2: A write operation is executed for the target sector after the erase based on the write command.

Step S3: A verify operation is executed for regenerating and verifying data from the target sector after the write operation.

Step S4: It is checked whether a verify-failed sector exists or not, and if the failed sector exists, the process proceeds to step S5, and otherwise, the process proceeds to step S9.

Step S5: It is checked whether the verify retry reaches the predetermined number resulting in retry-out or not. If the verify retry is not retry-out, the process proceeds to step S8; and if the verify retry is retry-out, the process proceeds to step S6.

Step S6: It is checked whether the write retry reaches the predetermined number to be retry-out or not. If the write retry is not retry-out, the process proceeds to step S11; and if the verify retry is retry-out, the process proceeds to step S7.

Step S7: This procedure is the case where both of the verify retry and the write retry is retry-out, and after determining as a defective sector, a replacement process is executed and the process is terminated.

Step S8: This procedure is the case where the verify retry is not retry-out, and verify is executed again after changing the verify condition and returning to step S3.

Step S9: This procedure is the case where the verify retry succeeds, and by learning the regeneration power and the regeneration magnetic field which are regeneration conditions of the last verify retry process, default or previous regeneration conditions are changed to the optimized conditions determined by the learning.

Step S10: This procedure is the case where the write retry succeeds, and by learning the write power which is regeneration condition of the last write retry process, the default or previous regeneration condition is changed to the optimized condition determined by the learning.

Step S11: This procedure is the case where the write retry is not retry-out, and the process is executed again from the erase after changing the write condition and returning to step S1.

In details of the read leaning process in step S9 of FIG. 2, although the timing is different, the process procedures are the same as the flowchart of the read command process of FIGS. 1A and 1B. In other words, in the read learning process with the write verify, when multiple sectors are processed by a write command and completed normally, a retry setting is learned at the time of termination to change default conditions. In this case, a target of the learning is a retry setting when the last sector is processed. In other words, the read learning is performed when the write command process is completed; a counter is controlled by the last successful mode; the regeneration power and the regeneration magnetic field are learned; and regeneration conditions for the write verify are optimized.

FIG. 3 is a flowchart of the write learning process in step S10 for the write command of FIG. 2 which consists of following process procedures.

Step S1: It is checked whether contents for changing the write power setting of last successful retry mode exist or not and if the contents for changing the setting exist, the process proceeds to step S2, and otherwise, the process is terminated.

Step S2: It is checked whether, at the time of the successful write retry, the write power setting is power up or not. If the setting is power up, the process proceeds to step S3; and otherwise, the process proceeds to step S4.

Step S3: A record power learning counter is updated.

Step S4: It is checked whether, at the time of the successful write retry, the write power setting is power down or not. If the setting is power down, the process proceeds to step S5; and otherwise, the process proceeds to step S6.

Step S5: A record power learning counter is updated.

Step S6: It is checked whether the counter exceeds a threshold or not. If exceeding, the process proceeds to step S7; and otherwise, the process is terminated.

Step S7: By learning the write power which is a write condition of the last write retry process, a default or previous record condition is changed to the optimized condition determined by the learning. For example, if the record condition of the last retry process is to up the power, the default write power is increased by predefined value (see, e.g., Japanese Patent Application Laid-Open Publication No. 2000-182292).

However, in such a conventional optical storage apparatus, when a retry occurs in regeneration and when processes of multiple sectors are normally completed with one (1) read command by implementing predefined staged settings for intensities of a laser beam and a regeneration magnetic field, since a default condition is changed by learning a retry setting at the time of termination, the target of learning will be a retry setting at the time of processing the last sector; therefore, when large majority of sectors are processed by one (1) command, a retry conditions may not necessarily accord with a retry condition when the last sector is processed; and from the point of view of whole sectors, mismatched learning may be performed resulting in a problem. The timing of the learning is the same in the case of recording, and if a retry occurs when multiple sectors are processed by one (1) command, the target of learning will be a record setting and a verify setting at the time of processing the last sector, and therefore, from the point of view of one (1) command, mismatched learning may be performed resulting in a problem.

SUMMARY OF THE INVENTION

According to the present invention there are provided an optical storage apparatus, a method for regeneration from optical storage medium and a method for storage on optical storage medium, ensuring stable recording and regeneration by finding optimum conditions from regeneration and record conditions due to the retry in the case that errors are generated in regeneration or recording operation and by reflecting the conditions to next regeneration and record conditions.

<Read/Retry>

The present invention provides an optical storage apparatus regenerating data on an optical storage medium using a laser beam and an externally applied magnetic field, comprising a read retry processing unit 68 which if regeneration is not performed normally when the data is regenerated from the medium, changes the intensities of the laser beam and of the regeneration magnetic field respectively to prearranged stages to perform the regeneration again; and a regeneration condition change unit 70 which remembers the regeneration sector number for one (1) command from the higher order and, when retry occurs, counts the number of the sectors for each stage which can be regenerated at each stage, the regeneration condition change unit providing a coefficient for each stage in advance to thereby change the default regeneration condition by use of the sum of products of the coefficients and the number of the counted regenerable sectors.

If a predefined threshold is exceeded by the sum of products of the coefficients and the number of the counted regenerable sectors during retry regeneration of the read retry processing unit 68, the regeneration condition change unit 70 calculates an optimum regeneration condition for all previously processed sectors and changes the default regeneration condition to the optimum regeneration condition.

If a predefined threshold is exceeded by the sum of products of the coefficients and the number of the counted regenerable sectors when regeneration is completed for one (1) command, the regeneration condition change unit 70 may calculate an optimum regeneration condition for all sectors processed during one (1) command and change the default regeneration condition to the optimum regeneration condition.

<Write/Retry>

The present invention provides an optical storage apparatus recording data on an optical storage medium using a laser beam, comprising a write retry processing unit 78 which if the recording is not performed normally when the data is recorded on the optical storage medium, changes the writing intensity of the laser beam to prearranged stages to perform the write again; and a recording condition change unit 80 which remembers the recording sector number for one (1) command from the higher order and, when retry occurs, counts the number of the sectors for each stage which can be recorded at each stage, the recording condition change unit 80 providing a coefficient for each stage in advance to thereby change the default recording condition by use of the sum of products of the coefficients and the number of the counted recordable sectors.

In the case that the data is recorded on the optical storage medium by applying an external magnetic field in concurrence with the laser beam, if a predefined threshold is exceeded by the sum of products of the coefficients and the number of the counted recordable sectors during the recording retry of the write retry processing unit 78, the recording condition change unit 80 calculates an optimum recording condition for all previously processed sectors and changes the default recording condition to the optimum recording condition.

If a predefined threshold is exceeded by the sum of products of the coefficients and the number of the counted recordable sectors when the recording is completed for one (1) command, the recording condition change unit 80 may calculate an optimum recording condition for all sectors processed during one (1) command and change the default recording condition to the optimum recording condition.

<Verify/Retry>

The present invention provides an optical storage apparatus recording data on an optical storage medium using a laser beam and an externally applied magnetic field, comprising a verify retry processing unit 84 which if regeneration is not performed normally when the verify regeneration is performed after the data is written on the medium, changes the intensities of the laser beam and of the regeneration magnetic field respectively to prearranged stages to perform the verify again; and a verify condition change unit 86 which remembers the recording sector number for one (1) command from the higher order and, when retry occurs in the verify regeneration, counts the number of the sectors for each stage which can be regenerated at each stage, the verify condition change unit 86 providing a coefficient for each stage in advance to thereby change the default verify condition by use of the sum of products of the coefficients and the number of the counted regenerable sectors.

If a predefined threshold is exceeded by the sum of products of the coefficients and the number of the counted regenerable sectors during the verify retry of the verify retry processing unit 84, the verify condition change unit 86 calculates an optimum verify condition for all previously processed sectors and changes the default verify condition to the optimum verify condition.

If a predefined threshold is exceeded by the sum of products of the coefficients and the number of the counted regenerable sectors when the verify is completed for one (1) command, the verify condition change unit 86 may calculate an optimum verify condition for all sectors processed during one (1) command and change the default verify condition to the optimum verify condition.

<Method>

The present invention further provides a regeneration method and a recording method of an optical storage medium.

The regeneration method of the present invention is a regeneration method for regenerating data using a laser beam and an externally applied magnetic field, comprising:

a read retry processing step of, if regeneration is not performed normally when the data is regenerated from the medium, changing the intensities of the laser beam and of the regeneration magnetic field respectively to prearranged stages to perform the regeneration again; and a regeneration condition change step of remembering the regeneration sector number for one (1) command from the higher order and, when retry occurs, counting the number of the sectors for each stage which can be regenerated at each stage, the regeneration condition change step providing a coefficient for each stage in advance, thereby changing the default regeneration condition by use of the sum of products of the coefficients and the number of the counted regenerable sectors.

The regeneration condition change step includes, if a predefined threshold is exceeded by the sum of products of the coefficients and the number of the counted regenerable sectors during regeneration retry of the read retry processing step, calculating an optimum regeneration condition for all previously processed sectors and changing the default regeneration condition to the optimum regeneration condition.

The regeneration condition change step may include, if a predefined threshold is exceeded by the sum of products of the coefficients and the number of the counted regenerable sectors when the regeneration is completed for one (1) command, calculating an optimum regeneration condition for all sectors processed during one (1) command and changing the default regeneration condition to the optimum regeneration condition.

The recording method of the present invention is a recording method of an optical storage medium for recording data using a laser beam, comprising:

a write retry processing step of, if the recording is not performed normally when the data is recorded on the optical storage medium, changing the writing intensity of the laser beam to prearranged stages to perform the write again; and a recording condition change step of remembering the recording sector number for one (1) command from the higher order and, when retry occurs, counting the number of the sectors for each stage which can be recorded at each stage, the recording condition change step providing a coefficient for each stage in advance, thereby changing the default recording condition by use of the sum of products of the coefficients and the number of the counted recordable sectors.

In the case that the data is recorded on the optical storage medium by applying an external magnetic field in concurrence with the laser beam, the recording condition change step includes, if a predefined threshold is exceeded by the sum of products of the coefficients and the number of the counted recordable sectors during the recording retry of the write retry processing step, calculating an optimum recording condition for all previously processed sectors and changing the default recording condition to the optimum recording condition.

The recording condition change step may include, if a predefined threshold is exceeded by the sum of products of the coefficients and the number of the counted regenerable sectors when the recording is completed for one (1) command, calculating an optimum recording condition for all sectors processed during one (1) command and changing the default recording condition to the optimum recording condition.

The present invention further provides a recording method of an optical storage medium for recording data using a laser beam and an externally applied magnetic field, comprising:

a verify retry processing step of, if regeneration is not performed normally when the verify regeneration is performed after the data is written on the medium, changing the intensities of the laser beam and of the regeneration magnetic field respectively to prearranged stages to perform the verify again; and a verify condition change step of remembering the recording sector number for one (1) command from the higher order and, when retry occurs in the verify regeneration, counting the number of the sectors for each stage which can be regenerated at each stage, the verify condition change step providing a coefficient for each stage in advance, thereby changing the default verify condition by use of the sum of products of the coefficients and the number of the counted regenerable sectors.

The verify condition change step includes, if a predefined threshold is exceeded by the sum of products of the coefficients and the number of the counted regenerable sectors during the verify retry of the verify retry processing step, calculating an optimum verify condition for all previously processed sectors and changing the default verify condition to the optimum verify condition.

The verify condition change step may include, if a predefined threshold is exceeded by the sum of products of the coefficients and the number of the counted regenerable sectors when the verify is completed for one (1) command, calculating an optimum verify condition for all sectors processed during one (1) command and changing the default verify condition to the optimum verify condition.

According to the present invention, by storing a setting at the time of success as statistical information from retry operations generated at the time of regeneration and recording and by a learning process in the case where a threshold is exceeded by the sum of the number of sectors successfully processed with each retry condition multiplied by a predefined coefficient corresponding to the retry condition during the retry process or after the process of one (1) command is completed, optimum conditions can be find for recording and regeneration of whole processed sectors and for recording and regeneration of whole storage medium; and stable recording and regeneration operations can be achieved by reflecting these conditions to default conditions for the next command. The above and other objects, features and advantages of the present invention will become more apparent from the following detailed description with reference to the drawings.

BRIEF DESCRIPTION OF THE DRAWINGS

FIGS. 4A and 4B are sector diagrams of optical storage apparatus to which the present invention is applied;

FIG. 7 is an explanatory view of data table generated for each mode in read retry of FIGS. 6A and 6B;

FIGS. 8A and 8B are explanatory views of data table for finding learning counter value from data table of FIG. 7;

FIG. 11 is an explanatory view of data table generated for each mode in Verify retry of FIGS. 10A and 10B;

FIG. 12 is an explanatory view of data table for finding learning counter value from data table of FIG. 11;

FIG. 14 is an explanatory view of data table generated for each mode in write retry of FIG. 13; and FIG. 15 is an explanatory view of data table for finding learning counter value from data table of FIG. 14.

DETAILED DESCRIPTION OF THE PREFERRED EMBODIMENT

Figure 4B:
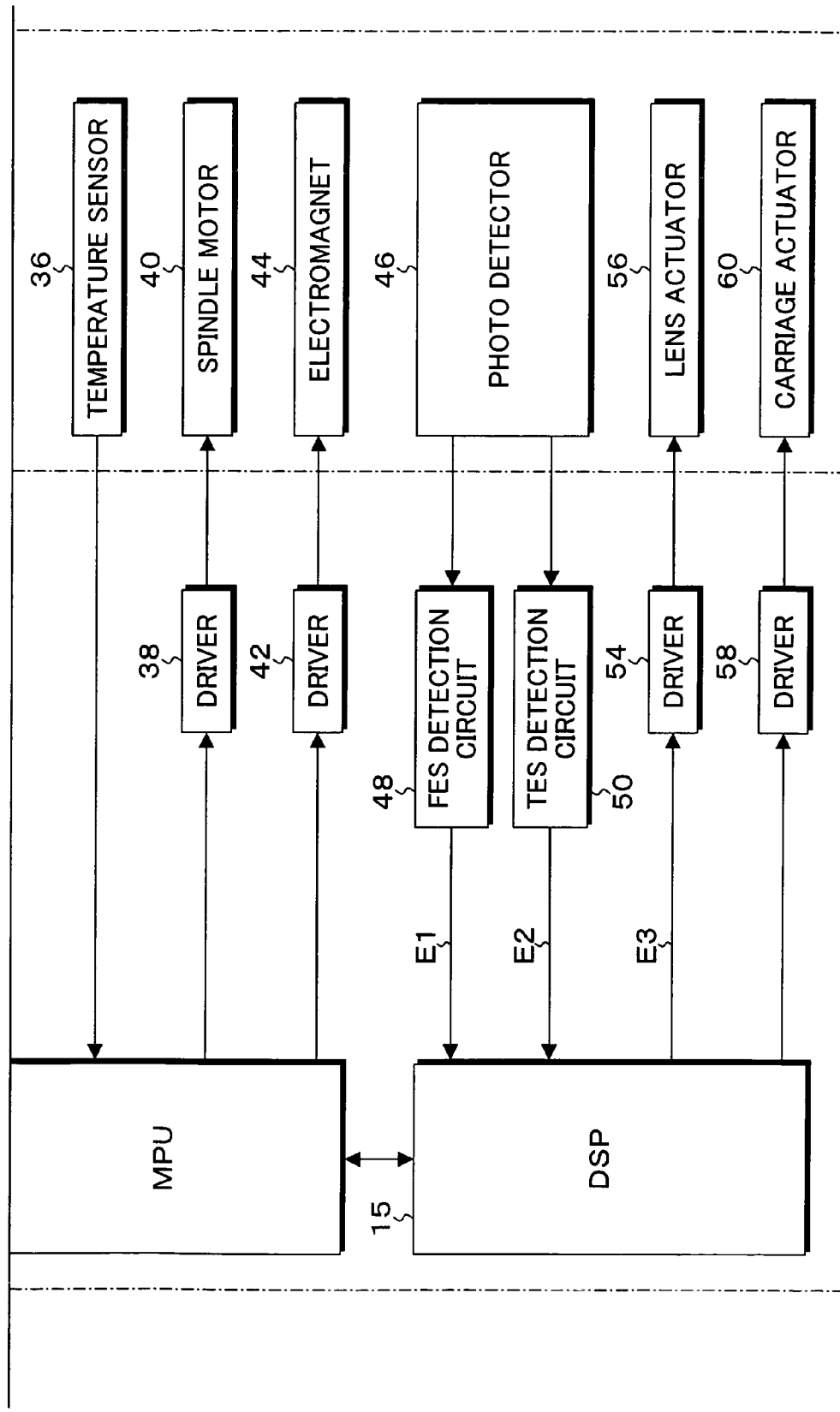

FIGS. 4A and 4B are sector diagrams of an optical disk drive as an optical storage apparatus of the present invention, and a magnetic optical disk (MO) cartridge is taken as an example of an optical storage medium.

The optical disk drive is a drive which can record and regenerate using lands, land grooves or grooves of the medium and consists of a controller 10 and an enclosure 12. The controller 10 is comprised of MPU 14 as firmware for overall control, an interface controller 16 communicating with a host, an optical disk controller (ODC) 18 comprising a formatter and ECC function needed for read and write of medium and a buffer memory 20.

The optical disk controller 18 is provided with an encoder 22 as a write system as well as detector 32, a head amplifier 34, a read LSI circuit 28 and decoder 26 as a read system to the optical disk controller 18. A laser diode control circuit 24 and a laser diode unit 30 are also provided.

The detector 32 receives returned light from the magnetic optical disk and outputs ID signal and MO signal via the head amplifier 34. The read LSI circuit 28 generates a read clock and read data from input ID signal and MO signal and outputs to the decoder 26. An environmental temperature inside the apparatus is detected by a temperature sensor 36 and input to MPU 14, and the emission power is optimized in the laser diode unit 30 based on the environmental temperature.

The MPU 14 controls a spindle motor 40 via a driver 38 and electromagnet 44 via a driver 42. The electromagnet 44 supplies an external magnetic field at the time of recording or erasing using MO cartridge and also supplies an external magnetic field at the time of regeneration in the case of a magnetically induced super resolution magnetic optical medium (MSR medium) in the 1.3 GB or 2.3 GB MO cartridge.

DSP 15 performs servo control for positioning an object lens provided on the head actuator to a target position for the magnetic optical disk based on a servo error signal. This servo control has two (2) functions which are track control for positioning the object lens to a target track position of the medium and focus control for controlling the object lens at a focusing position to the medium.

A photo detector 46, a focus error signal detection circuit 48 and a track error signal detection circuit 50 are provided, corresponding to this servo control. The focus error signal detection circuit 48 generates, for example, a focus error signal as a focus optical system, using a knife edge method.

For the focus control, the DSP 15 drives a lens actuator 55 with a driver 54 and positions the object lens to the focusing position in the direction of the light axis by turning on a focus servo with the focus retracting control. For the track control the DSP 15 drives a carriage actuator 60 using VCM with a driver 58 and positions the object lens to a target track center on the medium.

Figure 5:
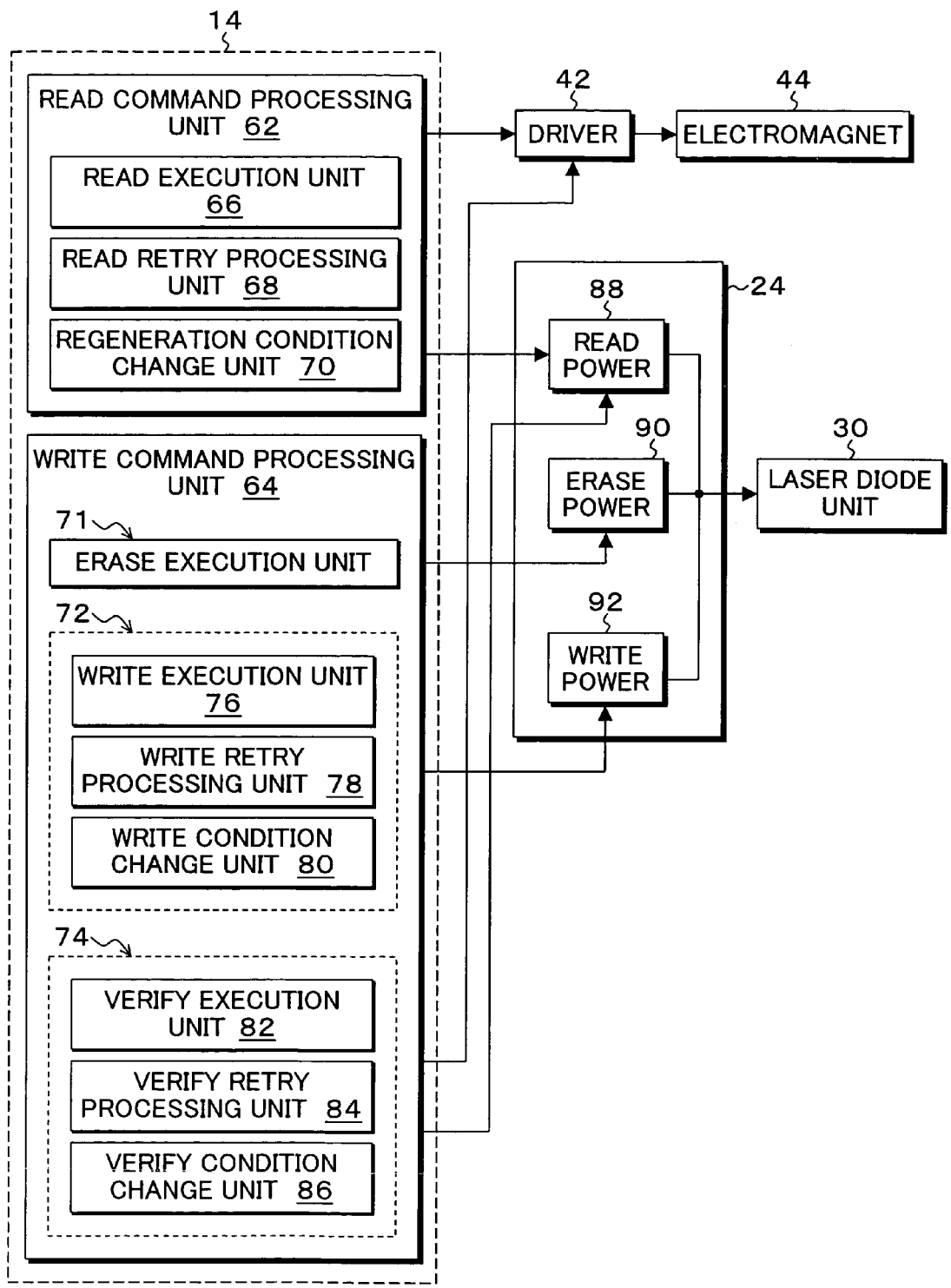
FIG. 5 is a sector diagram of command process function according to the present invention.

FIG. 5 is a sector diagram of a command process function in the optical storage apparatus of FIGS. 4A and 4B. In FIG. 5, MPU 14 acting as firmware is provided with a read command processing unit 62 and a write command processing unit 64 achieved by program control.

The read command processing unit 62 is provided with a read execution unit 66, a read retry processing unit 68 and a regeneration condition change unit 70. At the time of read operations, the read command processing unit 62 controls intensity of the external magnetic field with the electromagnet 44 via the driver 42 and controls intensity of laser beams from the laser diode unit 30 via a read power control unit 88 provided on the laser diode control circuit 24.

The write command processing unit 64 is provided with an erase execution unit 71, a write processing unit 72 and a verify processing unit 74. The write processing unit 72 is provided with functions of a write execution unit 76, a write retry processing unit 78 and a write condition change unit 80.

The verify processing unit 74 is provided with functions of a verify execution unit 82, a verify retry processing unit 84 and a verify condition change unit 86.

The write command processing unit 64 controls a laser diode unit 30 such that needed power is achieved for each of the read power control unit 88, an erase power control unit 90 and a write power control unit 92 provided in the laser diode control circuit 24 at the time of the erase, write and verify read.

The read execution unit 66 provided in the read command processing unit 62 decodes a read command from the higher order host and executes read operations for one or more sectors at a certain position of the optical storage medium.

When the read processing unit 66 regenerates data, if regeneration of the data is not performed normally resulting in an error, the read retry processing unit 68 changes intensities of the laser beam and the regeneration magnetic field respectively to prearranged stages to perform the regeneration again. The regeneration condition change unit 70 remembers the regeneration sector number (also known as "block number") for one (1) read command from the host and, when retry occurs, counts the number of the sectors for each stage which can be regenerated at each stage, and by providing a coefficient for each stage in advance, changes the default regeneration condition with the sum of products of the coefficients and the number of the counted regenerable sectors.

AS specific processes of the regeneration condition change unit 70, when a predefined threshold is exceeded by the sum of products of the coefficients and the number of the counted regenerable sectors, the default regeneration condition is changed by calculating an optimum regeneration condition for all sectors processed by previous commands or one (1) command.

When receiving write commands or data from the host, the write command processing unit 64 targets predefined one or more sectors of the optical storage medium to be written, performs the erase operation by operating the erase execution unit 71, then performs the data write operation by operating the write processing unit 72 and finally performs the verify operation for reading out and checking the written data by operating the verify processing unit 74.

Among these units, when recording data to the optical storage medium, if the recording is not performed normally resulting in an error, the write retry processing unit 78 provided in the write processing unit 72 changes the writing intensity of the laser beam to prearranged stages to perform the write again.

The write condition change unit 80 remembers the recording sector number for one (1) write command from the host and, when retry occurs, counts the number of the sectors for each stage which can be recorded at each stage, and by providing a coefficient for each stage in advance, changes the default recording condition with the sum of products of the coefficients and the number of the counted recordable sectors.

AS specific processes of the write condition change unit 80, when a predefined threshold is exceeded by the sum of products of the coefficients and the number of the counted recordable sectors, the default recording condition is changed by calculating an optimum recording condition for all sectors processed by previous commands or one (1) command.

After the write processing unit 72 writes data on the magnetic optical medium, when verify regeneration is performed, if the verify is not performed normally resulting in an error, the verify retry processing unit 84 of the verify processing unit 74 changes intensities of the laser beam and the regeneration magnetic field respectively to prearranged stages to perform the verify again.

The verify condition change unit 86 remembers the recording sector number for one (1) write command from the host and, when retry occurs in the verify regeneration, counts the number of the sectors for each stage which can be regenerated at each stage, and by providing a coefficient for each stage in advance, changes the default verify condition with the sum of products of the coefficients and the number of the counted regenerable sectors.

AS specific processes of the verify condition change unit 86, when a predefined threshold is exceeded by the sum of products of the coefficients and the number of the counted regenerable sectors, the default verify condition is changed by calculating an optimum verify condition for all sectors processed by previous commands or one (1) command.

The respective functions of the verify execution unit 82, the verify retry processing unit 84 and the verify condition change unit 86 in the verify processing unit 74 have actually the same process functions as the read execution unit 66, the read retry processing unit 68 and the regeneration condition change unit 70 provided in the read command processing unit 62, and differences are types of the executed command and the timing thereof only.

Therefore, actually, the same program is used as functions of the read command processing unit 62 and the verify processing unit 74, and the timing of execution for the command is only changed.

Figure 6A:
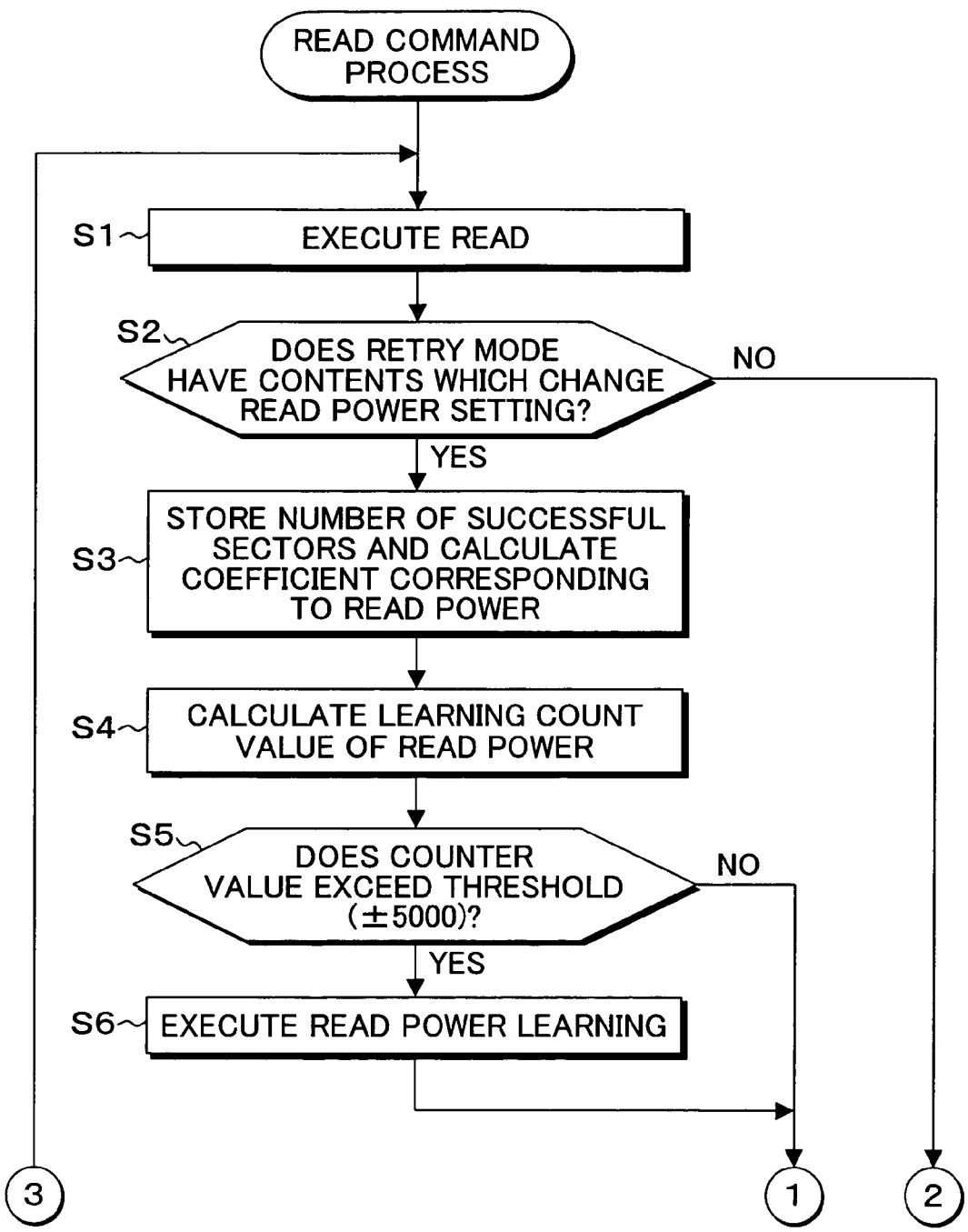
FIGS. 6A and 6B are flowcharts of read command process according to the present invention.
Figure 6B:
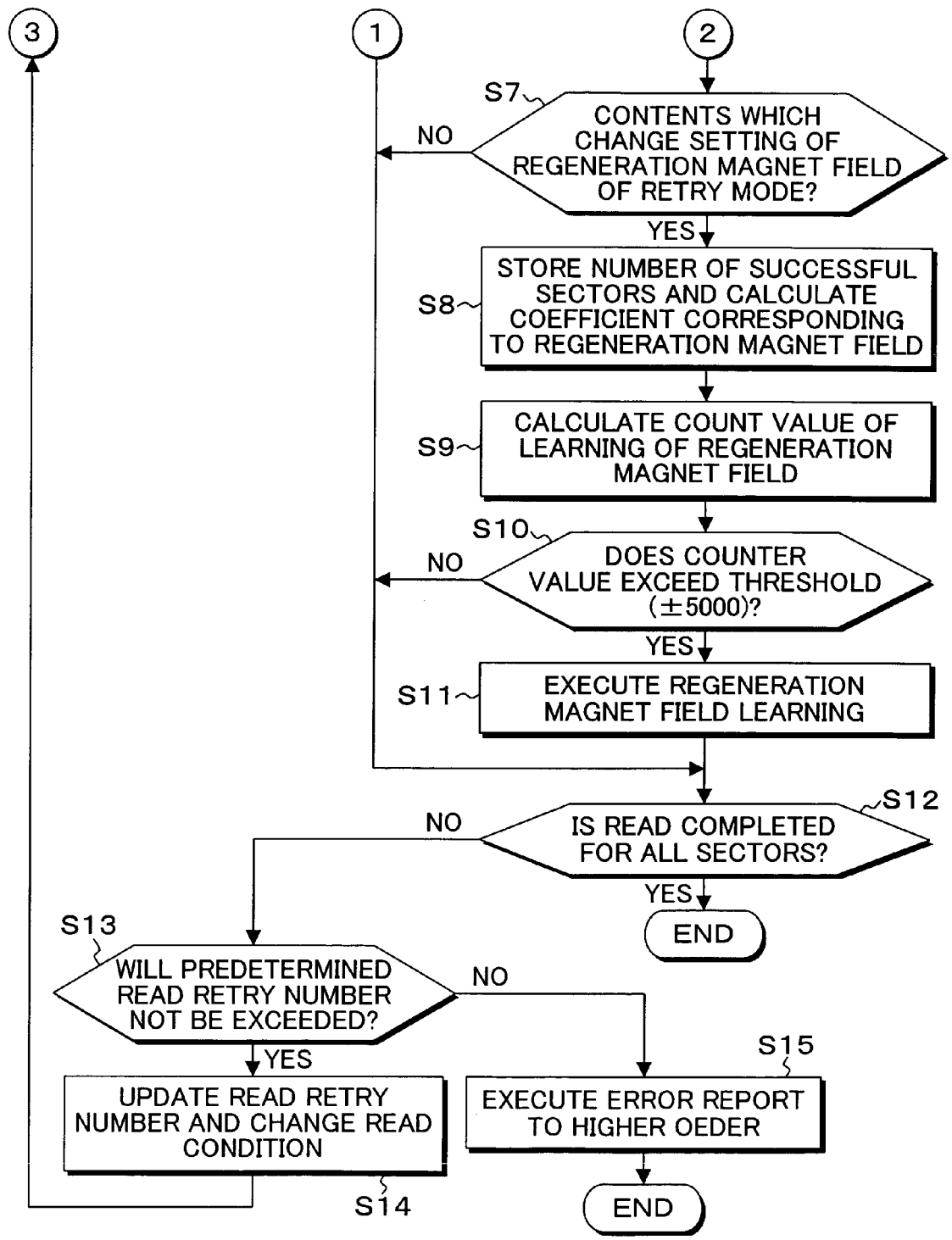

FIGS. 6A and 6B are flowcharts of a read command process according to the present invention. In the read command process of the present invention, when the retry occurs in the read operation, the read learning process is executed for each switchover of the retry mode changing the setting of the read power or the regeneration magnetic field, rather than after the read command is completed in the conventional way, and by setting a coefficient for each retry mode, the read learning is performed with the successful sector numbers and the coefficients of each mode. Therefore, in the read command process of the present invention, the successful sector numbers and the coefficients are managed for each retry mode.

In such a read command process, operation requirements of the read learning process of the present invention are as follows.

(1) The coefficient is set for each retry mode.
(2) The successful sector number is multiplied by the coefficients corresponding to each of the regeneration power and the regeneration magnetic field for each retry mode.
(3) If the threshold is exceeded by the sum of multiplied values for each retry mode, the learning is executed and the default value is updated.

As an example of the read learning operation, the read operation for 10 sectors is as follows. It is assumed that, for example, a data table of FIG. 7 shows contents of the retry, the successful sector numbers and the processed sector numbers of the retry modes. The read retry modes are set as follows, for example.

Mode 0: (default read power)
Mode 1: (default read power)+(offset)
Mode 2: (default read power)−(offset)
Mode 3: (default read power)+2×(offset)
Mode 4: (default read power)−2×(offset)

It should be noted that the coefficients in the data table of FIG. 7 can be finely set in accordance with conditions such as a temperature.

If learning counter values are found for the data table generated for each read retry mode of FIG. 7, the counter values are found as shown in FIG. 8A. In the data table of FIG. 8A, the successful sector number in mode 0 is zero, and when multiplying coefficient −1, a product becomes zero, so that the counter value becomes 0 in this case.

In mode 1, since the successful sector number is 3 and the coefficient is +1000, the product is +3000, and by adding the counter value in mode 0, the counter value becomes +3000. In mode 2, since the successful sector number is 7 and the coefficient is −1000, the product is −7000, and by adding the counter value +3000 up to mode 1, the counter value becomes −4000.

Assuming that ±5000 is set as a threshold for determining execution of the read learning, since the counter value −4000 obtained in the example of FIGS. 8A and 8B does not exceed the threshold ±5000, in this case, at the time of termination of the read command, the counter value −4000 in the retry mode 2 is carried over as a learning counter initial value in the case that the regeneration power is changed to retry at the time of the read command process of the magnetic field. On the other hand, if the counter value exceeds the threshold ±5000, the default value of the regeneration power is updated, and the counter value is cleared to 0.

At this point, if the same read command is issued from the host to the identical sector, since the regeneration condition is not changed, an error occurs as is the case with the first time, and the same retry operation as FIG. 7 is performed. In the second time, the counter values are as shown in FIG. 8B.

In other words, the initial value of the counter is −4000 which is carried over by the previous process of FIG. 8A, and the successful sector number in mode 0 is zero, and when multiplying coefficient −1, a product becomes zero, so that the counter value becomes −4000 in this case.

In mode 1, since the successful sector number is 3 and the coefficient is +1000, the product is +3000, and by adding the counter value in mode 0, the counter value becomes −1000.

In mode 2, since the successful sector number is 7 and the coefficient is −1000, the product is −7000, and by adding the counter value −1000 up to mode 1, the counter value becomes −8000 and exceeds the threshold ±5000, so that the default condition is changed.

When the default condition is changed, for example, since the polarity of the final counter value is "minus", the changed default read power is a value obtained by subtracting a predefined value from the default read power. In this way, the default condition is approached to a more optimum condition based on the previous retry history.

On the other hand, if the polarity of the final counter value is "plus", the changed default read power is a value obtained by adding a predefined value to the default read power. Other than adding or subtracting the predefined value in accordance with the polarity of the counter value as describe, the default condition may be changed by multiplying a coefficient not less than 1 in the case of plus or a coefficient less than 1 in the case of minus. Further, the default condition may be changed to the retry contents having the greatest success rate out of the retry read history, which are the read power of mode 2 in this example.

This modification of the default condition based on the retry results is basically the same as the case of the regeneration magnetic field.

Consequently, the process procedures of the read command process of FIGS. 6A and 6B includes details of the read learning operation in the read command and is described as follows.

Step S1: the read operation is executed for one or more sectors of the specified track of the optical storage medium, based on the read command received from the host.

Step S2: It is checked whether the retry mode has contents for changing the read power setting or not. If having contents for changing the setting, the process proceeds to step S3; and otherwise, the process proceeds to step S7.

Step S3: The successful sector number is stored for the retry mode before changing the setting and the coefficient is calculated in accordance with the read power.

Step S4: The count value is calculated for the read power learning.

Step S5: It is checked whether the count value exceeds the threshold value (±5000) or not. If exceeding, the process proceeds to step S6; and otherwise, the process proceeds to step S12.

Step S6: The read power learning is executed; the optimum regeneration condition is calculated for all processed sectors; the default regeneration condition is changed into the optimum regeneration condition; and the process proceeds to step S12.

Step S7: This procedure is the case that the read power of the retry mode has no change in step S2, and in this case, it is checked whether the contents change the setting of the regeneration magnetic field of the retry mode or not. If the contents change the setting, the process proceeds to step S8; and otherwise, the process proceeds to step S12.

Step S8: The successful sector number is stored for retry mode of the regeneration magnetic field before changing the setting and the coefficient is calculated in accordance with the regeneration magnetic field.

Step S9: The count value is calculated for the regeneration magnetic learning.

Step S10: It is checked whether the count value exceeds the threshold value (±5000) or not. If exceeding, the process proceeds to step S11; and otherwise, the process proceeds to step S12.

Step S11: The regeneration magnetic power learning is executed. In other words, the regeneration condition is calculated for optimum regeneration magnetic field to all previously processed sectors; and the default regeneration condition is changed into this regeneration condition.

Step S12: It is checked whether the read is completed for all sectors; if not completed, the process proceeds to step S13; and if completed, the process is terminated.

Step S13: It is checked whether the predetermined read retry number is exceeded or not. If not exceeded, the process proceeds to step S14; and if exceeded, the process proceeds to step S15.

Step S14: The read retry number is updated; the read condition is changed; and the process returns to step S1.

Step S15: This procedure is the case where the predetermined number of the retry is exceeded resulting in retry out, and an error report is performed to higher order by determining as a medium defection.

Figure 9:
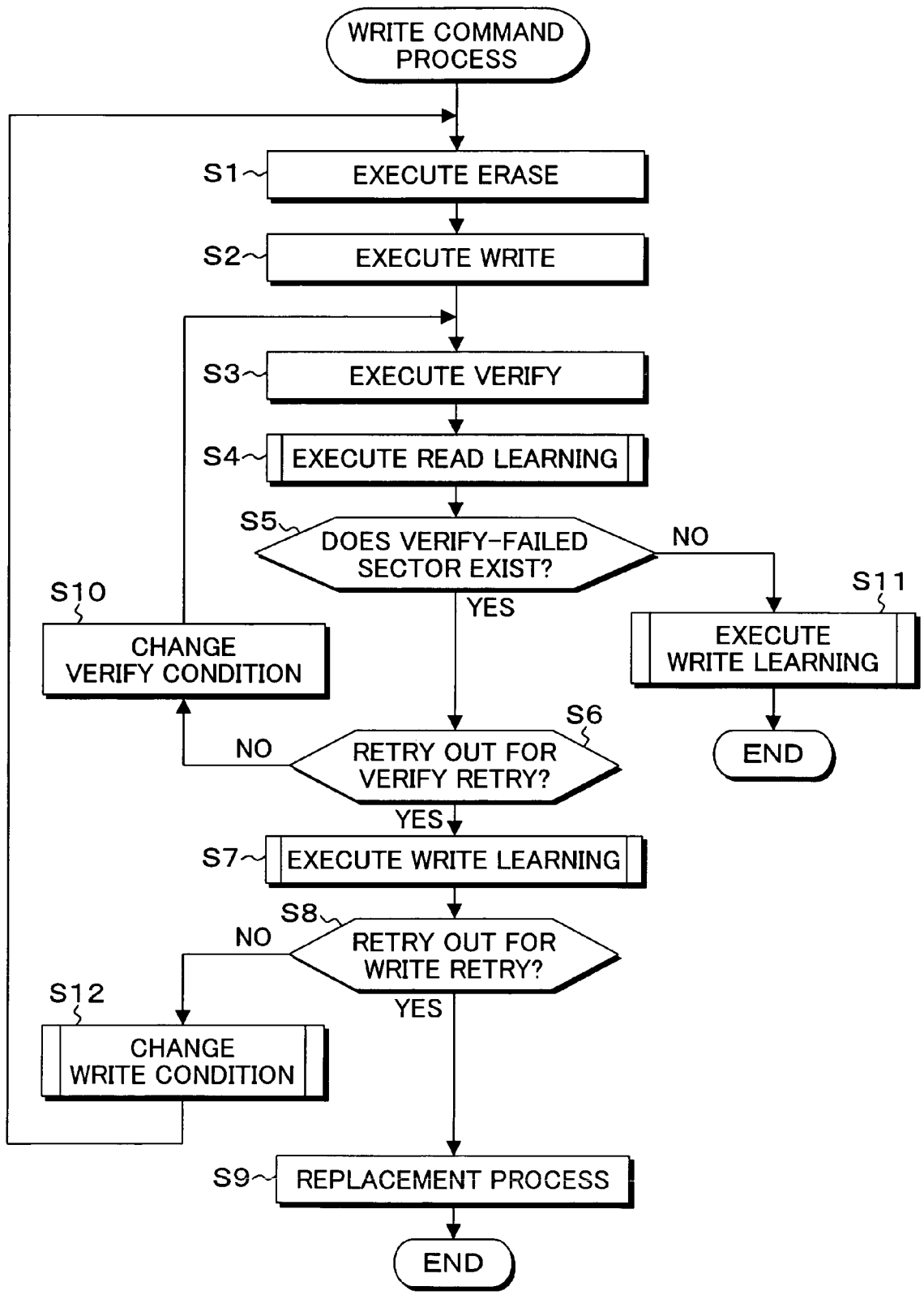
FIG. 9 is a flowchart of write command process according to the present invention.

FIG. 9 is a flowchart of a write command process in the optical storage apparatus of the present invention. Learning processes in the write command process includes two types which are a write power learning process and a read learning process in a write verify operation (learning of the regeneration power and the regeneration magnetic field).

Although the same parameters are learned in the read learning of the write verify operation and in the read learning of the read command shown in FIGS. 6A and 6B (learning of the regeneration power and the regeneration magnetic field), the learning is executed in different timing.

Figure 1A:
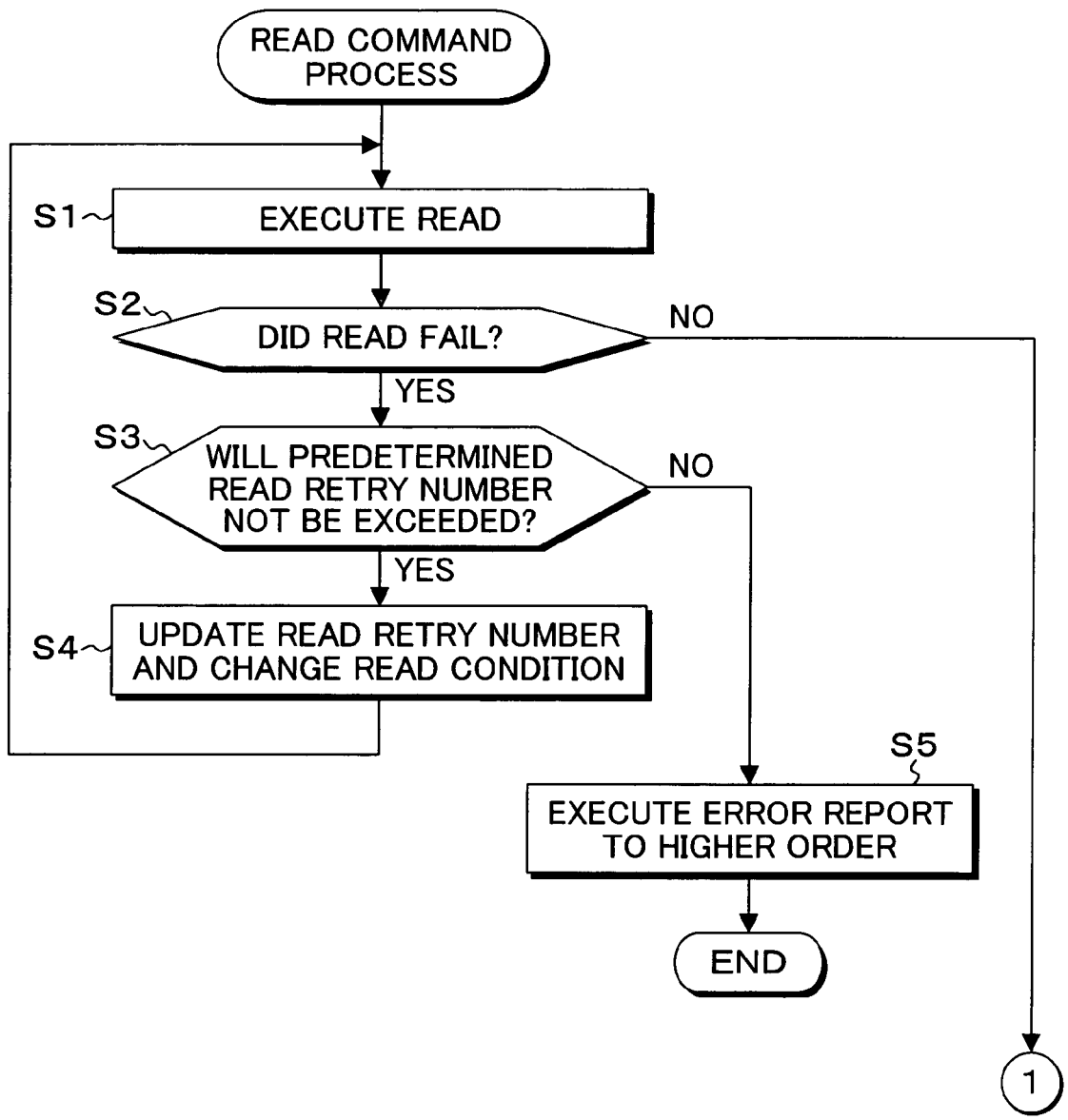
FIGS. 1A 1B and 1C are flowcharts of conventional read command process.
Figure 1B:
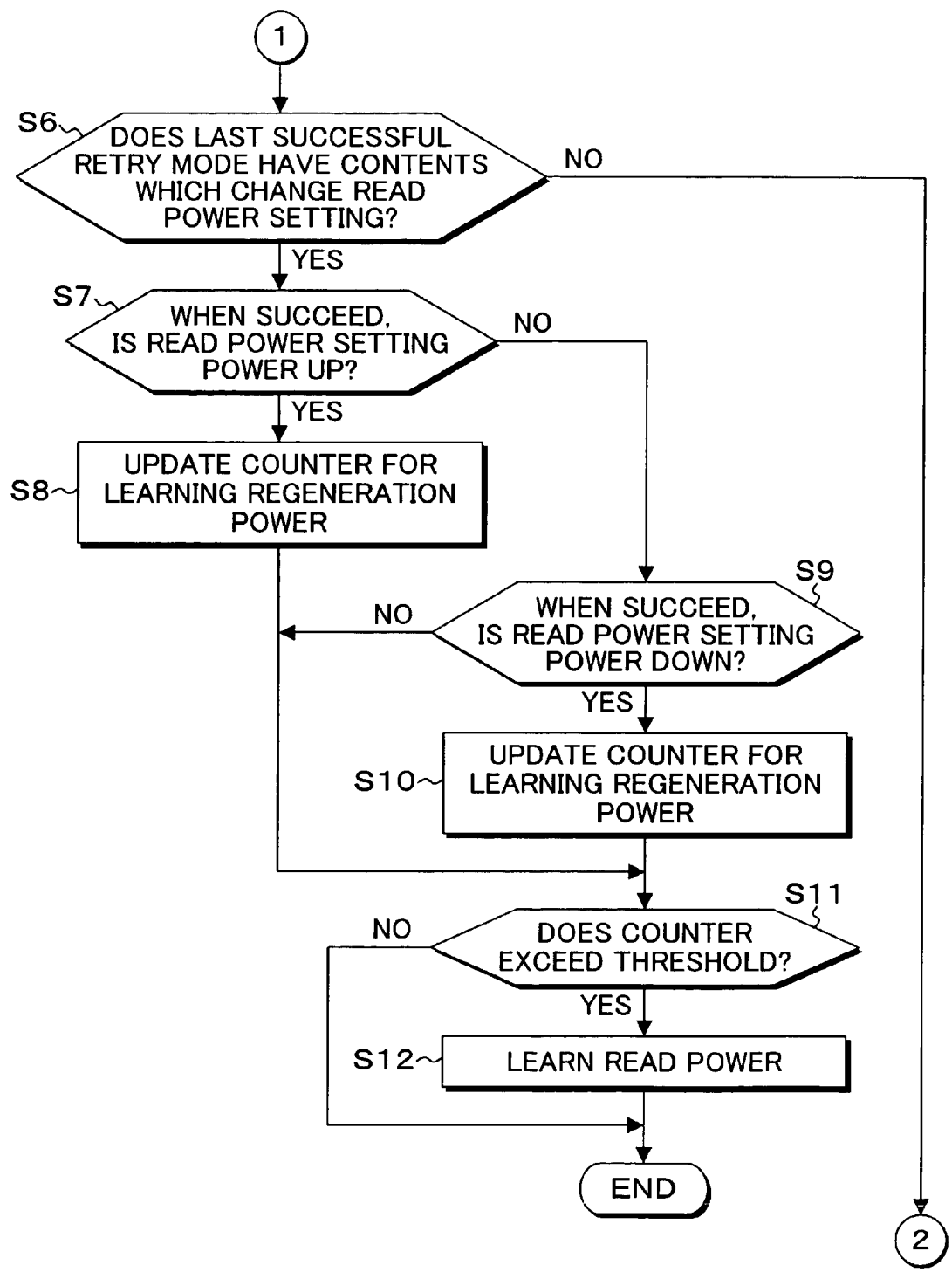
Figure 1C:
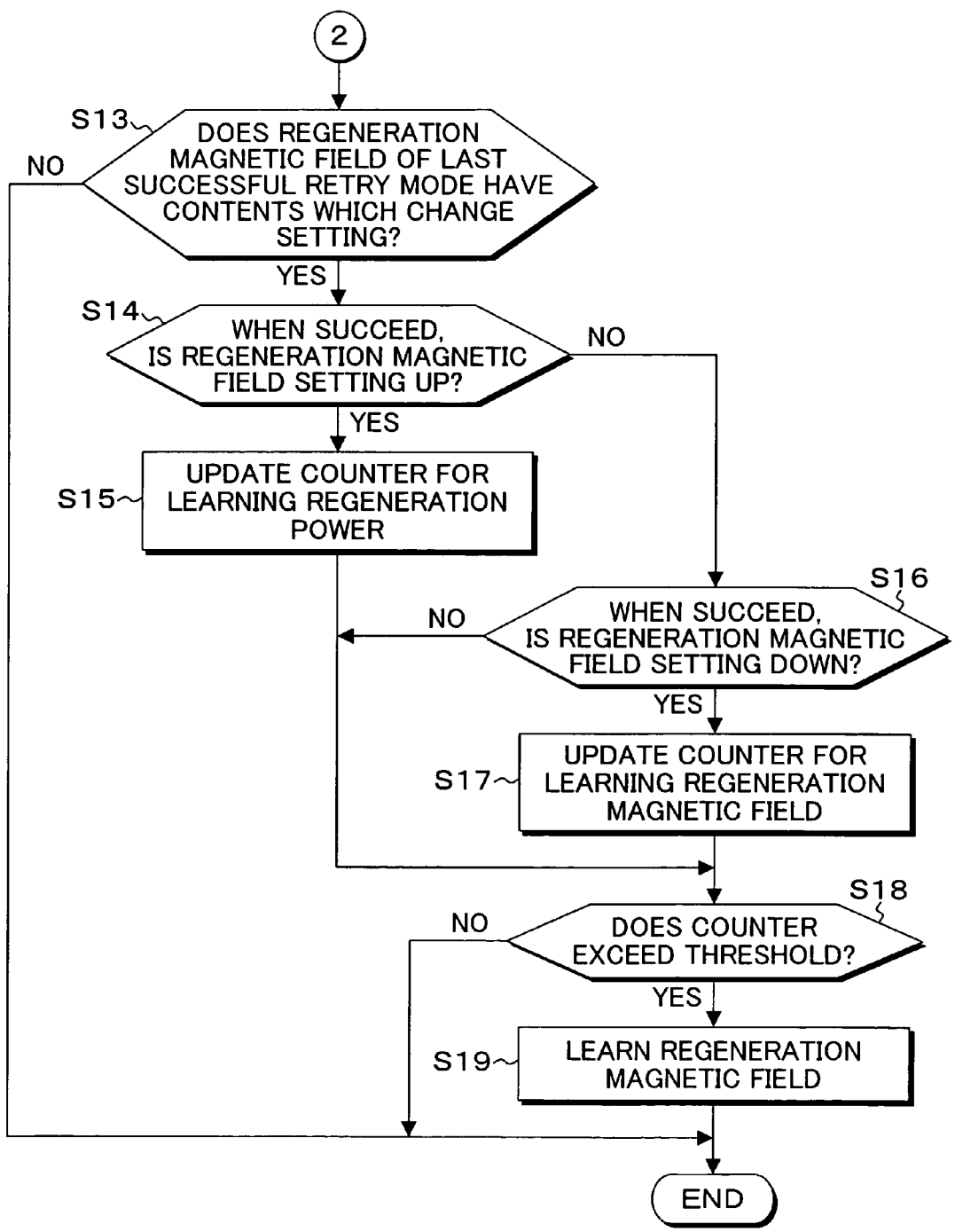
Figure 2:
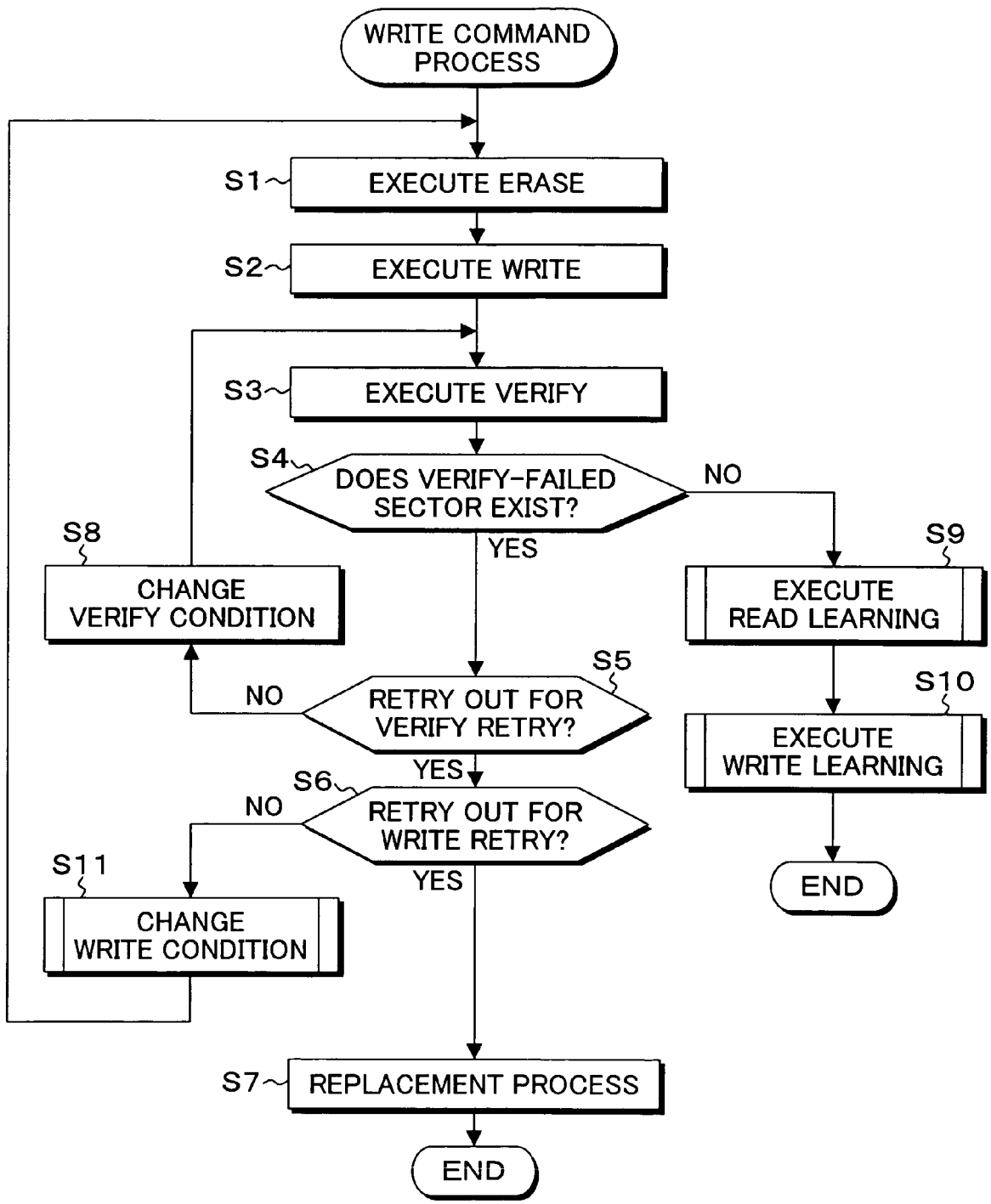
FIG. 2 is a flowchart of conventional write command process.
Figure 3:
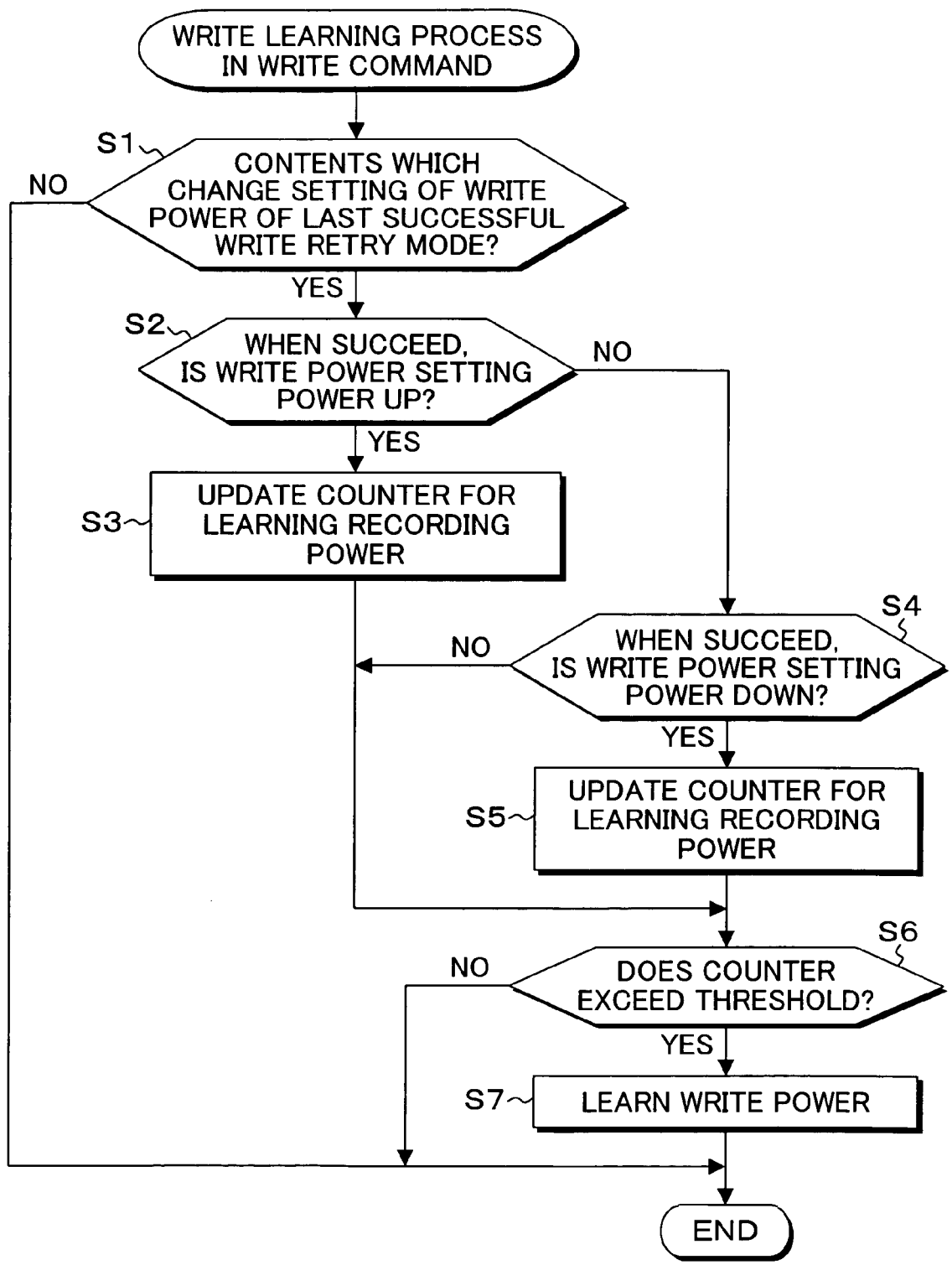
FIG. 3 is a flowchart of conventional write learning process in step S10 of FIG. 2.

In the write command process of the present invention, the verify read learning is executed for each verify retry of each write retry mode, rather than after the command is completed in the conventional write command process shown in FIG. 2, and the write learning process is executed for each retry out of the verify retry. Consequently, the process procedures of the write command process of FIG. 9 is described as follows.

Step S1: An erase operation is executed for a write target sector of the optical storage medium, based on the write command issued from the host.

Step S2: A write operation is executed for the erased target sector.

Step S3: A verify operation is executed for regenerating and verifying data from the target sector after the write operation.

Step S4: The read learning process is executed. Details are shown in a flowchart of FIGS. 10A and 10B.

Step S5: It is checked whether a verify-failed sector exists or not, and if the failed sector exists, the process proceeds to step S6, and if the failed sector does not exist, the process is terminated.

Step S6: It is checked whether the verify retry exceeds the predetermined number resulting in retry-out or not. If the verify retry is retry-out, the process proceeds to step S7; and otherwise, the process proceeds to step S11.

Step S7: The write learning process is executed. Details are shown in a flowchart of FIG. 13.

Step S8: It is checked whether the write retry exceeds the predetermined number resulting in retry-out or not. If the write retry is retry-out, the process proceeds to step S9; and otherwise, the process proceeds to step S11.

Step S9: By determining as a medium defection, a replacement process is executed.

Step S10: This procedure is the case where the verify retry is retry-out; the verify condition is changed; and the process returns to step S3.

Step S11: This procedure is in the state before the write retry becomes retry-out; the write condition is changed; and the process returns to step S1.

Step S12: The write condition is changed and the process returns to step S1.

Figure 10A:
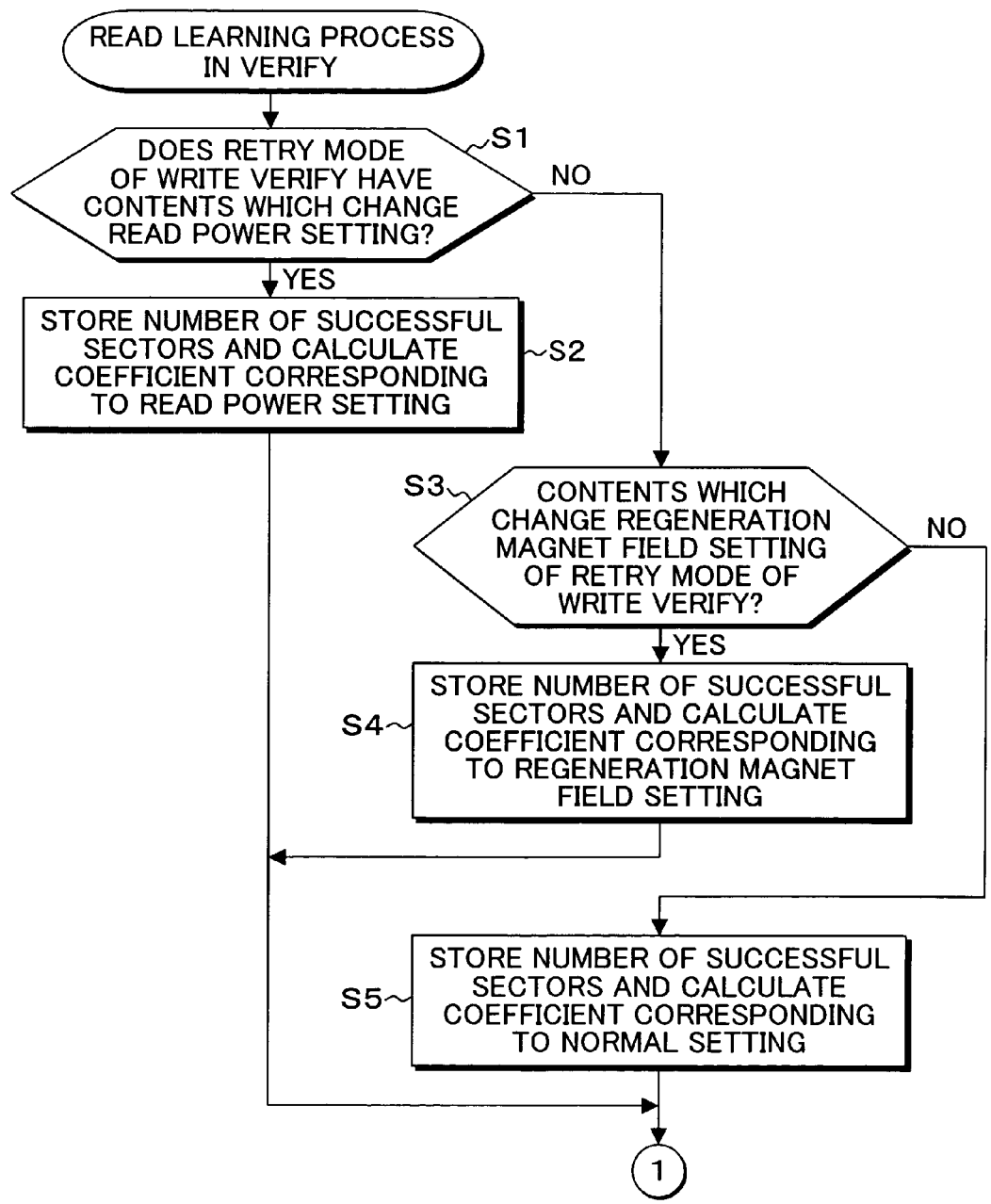
FIGS. 10A and 10B are flowcharts of read learning process in step S4 of FIG. 9.
Figure 10B:
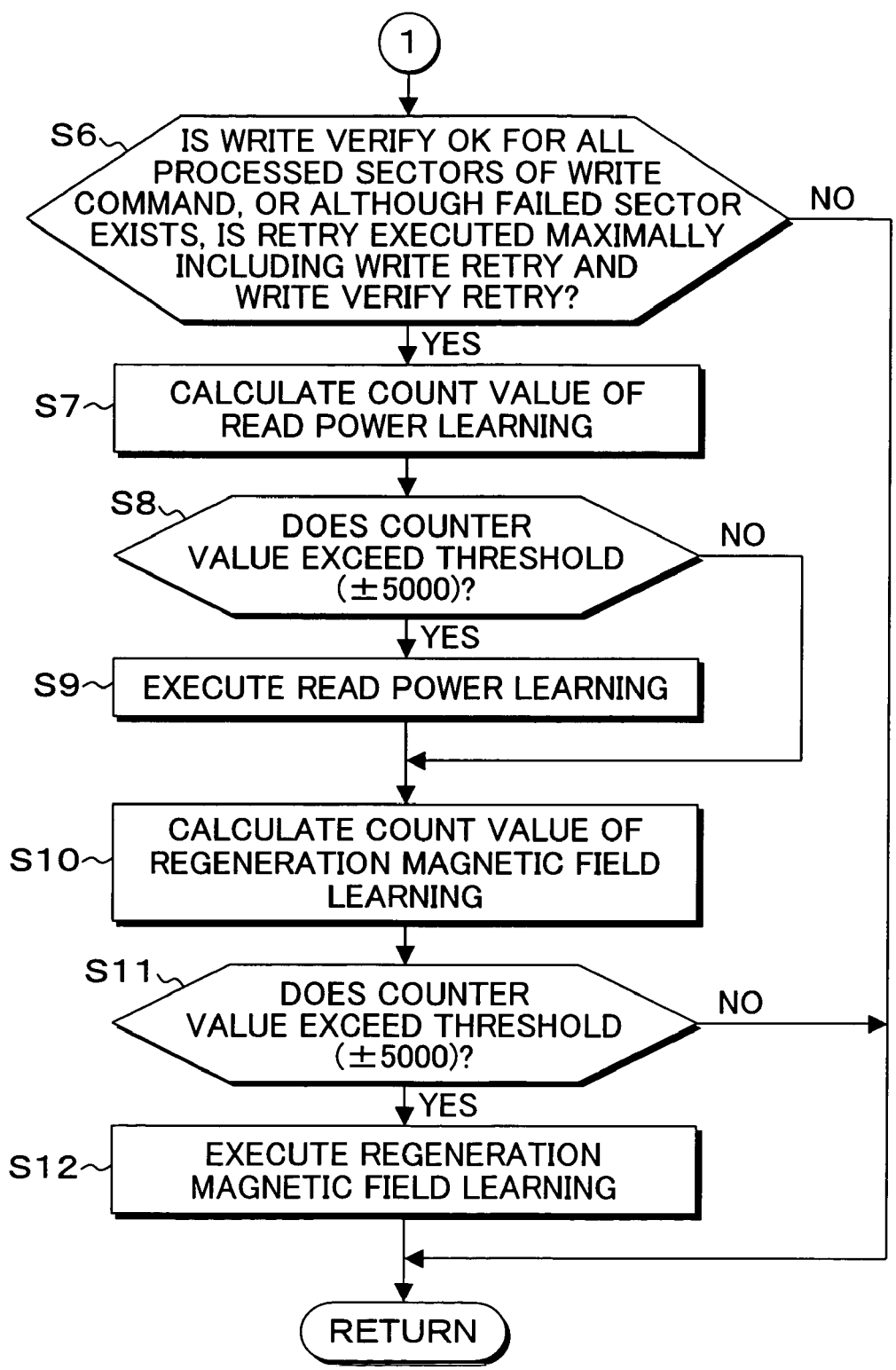

FIGS. 10A and 10B are flowcharts of the read learning process in the write verify in step S4 of FIG. 9. In the read learning process, the read learning process is executed for each verify retry in the write retry mode, rather than after the write command is completed in the conventional way.

As a result of the read learning process, determination whether the default value is updated or not is updated when the write command is completed normally or if the maximum retry is executed including the retry of the write verify and the write retry. The sector will be a target of the replacement process if that sector does not succeed after executing the maximum retry.

In the read learning process in the write verify of the present invention, the successful sector number and the processed sector number must be managed for each retry mode.

Consequently, in the write verify of the write command process, details of the operation of the read learning process according to the present invention are as follows.

(1) A coefficient is set for each verify retry mode.

(2) The successful sector number is multiplied by the coefficients corresponding to the regeneration power and the regeneration magnetic field for each verify retry mode.

(3) If the threshold is exceeded by the sum of multiplied values for each verify retry mode, the learning is executed and the default value is updated.

As an example of the operation of the read learning process, if the verify retry is executed in the read operation for 10 sectors, contents generated for each mode are as shown in the data table of FIG. 11. It is assumed that the verify retry mode is executed in the order of mode 0, mode 1 and mode 2.

At this point, if the write command process for 10 sectors is normally completed with the verify in the write retry mode 2, a learning counter value is obtained by a data table shown in FIG. 12 from the data table of FIG. 11. To calculate the counter, the sum of the products is calculated for the retry with contents which change the setting, and the sum of the products is calculated for the retry with contents which do not change the setting.

In FIG. 12, in model which is executed secondly, since the successful sector number is 3 and the coefficient is +1000, the product is +3000, and the counter value becomes +3000 in this case. In mode 2, since the successful sector number is 7 and the coefficient is −1000, the product is −7000, and by adding the counter value of mode 1, the counter value becomes −4000.

In the first mode 0, since the successful sector number is 0 and the retry contents are no condition change, the coefficient is −1; the product is 0; and by adding to the previous value up to mode 2, the counter value becomes −4000. If ±5000 has been set as a threshold for determining execution of the read learning, since the counter value −4000 does not exceed the threshold in this case, the counter value −4000 is carried over as a counter initial value for the learning process in the case that the regeneration power in the write command of the magnetic field is changed to execute the verify retry.

If the counter value exceeds the threshold, the default value of the regeneration power is updated, and the counter value is cleared to 0.

When the default condition is changed for the regeneration power, for example, if the polarity of the final counter value is "minus", the changed default read power is a value obtained by subtracting a predefined value from the default read power. On the other hand, if the polarity of the final counter value is "plus", the changed default read power is a value obtained by adding a predefined value to the default read power. In this way, the default condition is approached to a more optimum condition based on the previous retry history.

Other than adding or subtracting the predefined value in accordance with the polarity of the counter value as describe, the default condition of the regeneration power may be changed by multiplying a coefficient not less than 1 in the case of plus or a coefficient less than 1 in the case of minus. Further, the default condition may be changed to the retry contents having the greatest success rate out of the retry read history, which are the read power of mode 2 in this example.

The following is a description of the process procedures of the read learning process in the retry process of the write verify for FIGS. 10A and 10B.

Step S1: It is checked whether the retry mode of the write verify has contents for changing the read power setting or not. If having contents for changing the setting, the process proceeds to step S2; and otherwise, the process proceeds to step S3.

Step S2: The successful sector number is stored for the retry mode before changing the setting; the coefficient is calculated in accordance with the read power setting; and the process proceeds to step S6.

Step S3: It is checked whether the contents change the setting of the regeneration magnetic field of the retry mode of the write verify or not. If the contents change the setting, the process proceeds to step S4; and otherwise, the process proceeds to step S5.

Step S4: The successful sector number is stored for the retry mode before changing the setting of the regeneration magnetic field; the coefficient is calculated in accordance with the regeneration magnetic field setting; and the process proceeds to step S6.

Step S5: This procedure is the case that the setting is not changed for both of the read power and the regeneration magnetic field, and in this case, the successful sector number is stored and the coefficient is calculated in accordance with the normal setting.

Step S6: It is checked whether the write verify is OK for all processed sectors of the write command or not, or whether, although the failed sector exists, the retry is executed maximally including the write retry and the write verify retry or not. If this condition is fulfilled, the process proceeds to step S7; and otherwise, the read learning process is terminated and the process returns to the main routine of FIG. 9.

Step S7: The count value is calculated for the read power learning.

Step S8: It is checked whether the counter value exceeds the threshold value (±5000) or not. If exceeding, the process proceeds to step S9; and otherwise, the process proceeds to step S10.

Step S9: The read power learning is executed. In other words, the optimum regeneration condition is calculated for all previously processed sectors and the default regeneration condition is changed into the optimum regeneration condition.

Step S10: The count value is calculated for the regeneration magnetic learning.

Step S11: It is checked whether the count value exceeds the threshold value (±5000) or not. If exceeding, the process proceeds to step S12; and if exceeding, the process is terminated and returns to the main routine of FIG. 9.

Step S12: The regeneration magnetic power learning is executed. In other words, the regeneration condition is calculated for optimum regeneration magnetic field to all previously processed sectors; and the default regeneration condition is changed into this regeneration condition.

Figure 13:
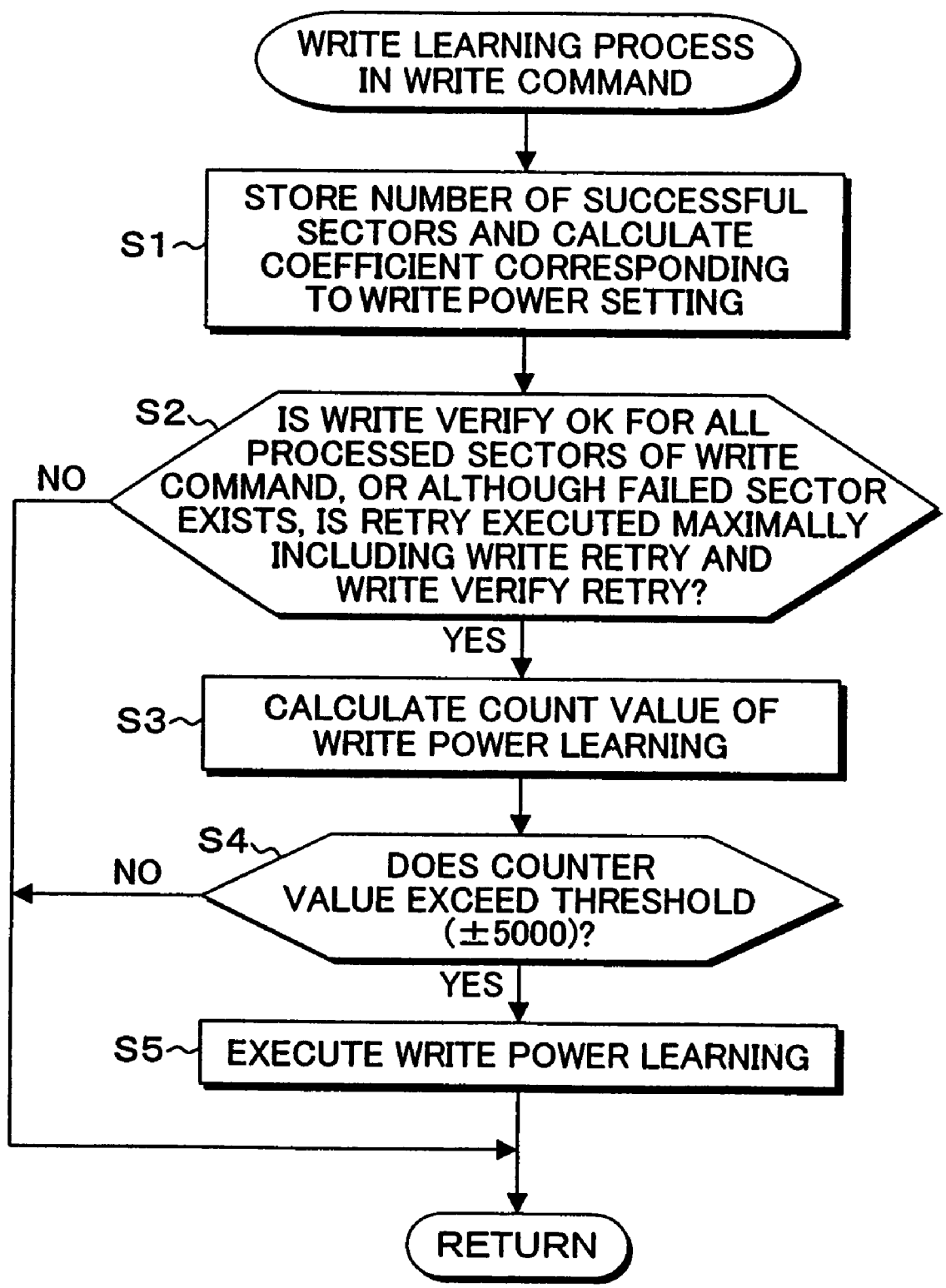
FIG. 13 is a flowchart of write learning process in step S7 of FIG. 9.

FIG. 13 is a flowchart of the write learning process in step S7 of FIG. 9. This write learning process is also executed at the time of termination of the verify sequence such as the write retry mode, rather than after the write command is completed in the conventional write command execution process; the coefficient are set for each retry mode; and the learning of the write power is executed in accordance with the successful sector numbers and the coefficient of each mode.

As a result of the learning, determination whether the default value is updated or not is performed when the write command is completed normally or if the maximum retry is executed including the retry of the write verify and the write retry. The sector will be a target of the replacement process if that sector does not succeed after executing the maximum retry. In order to execute this write learning process, the successful sector number and the processed sector number must be managed for each retry mode.

Consequently, for the write command, details of the operation of the write power learning process of the present invention are as follows.

(1) A coefficient is set for each write retry mode.

(2) The successful sector number is multiplied by the coefficients corresponding to the write power for each write retry mode.

(3) If the threshold is exceeded by the sum of multiplied values for each write retry mode, the learning is executed and the default value is updated.

When the write operation for 10 sectors is taken as an example of the write power learning operation, the retry contents, the successful sector number and the processed sector number in retry modes are as shown in the data table of FIG. 14, for example. It is assumed that the write retry mode is executed in the order of mode 0, mode 1 and mode 2.

For this data table of FIG. 14, the coefficients also can be finely set in accordance with conditions such as a temperature.

In the write retry based on the data table of FIG. 14, the learning counter value can be obtained in accordance with following details.

(1) The successful sector number is multiplied by the coefficient for the write retry which changes the condition.

(2) A sum is calculated for the values of the (1).

(3) The successful sector number is multiplied by the coefficient for the write retry which does not change the condition.

(4) A polarity of the value of the (2) is determined and following processes are performed in accordance with the polarity.

(4a) In the case of not greater than 0: the value of (3) is added to the value of (2), and if the result of the addition is not less than 0, zero (0) clip is performed.

(4b) In the case of greater than 0: the value of (3) is added to the value of (2), and if the result of the addition is less than 0, zero (0) clip is performed.

For the data table of FIG. 14, if the learning counter value is found in accordance with the procedures of the (1) to (4), the values are as shown in a data table of FIG. 15.

FIG. 15 is specifically described as follows. First, for write retry modes 1 and 2 which changes the conditions, successful sector numbers 3 and 7 is multiplied by coefficients +1000 and −1000 to obtain +3000 and −7000. A sum of the values of (1) is calculated as −4000.

Then, for write retry mode 0 which does not change the condition, successful sector numbers 0 is multiplied by a coefficient −1 to obtain 0 as a product. Subsequently, since a polarity of the value of (2) is determined as not greater then 0, by adding 0 obtained in (3) to −4000 obtained in (2), −4000 is obtained in accordance with the (a). As a result of the addition, since −4000 is not greater than 0, 0 clip is not performed, and the counter value will be −4000 without change.

For such a write learning process, a flowchart of FIG. 13 is worked out and process procedures thereof are described as follows.

Step S1: The successful sector number is stored and the coefficient is calculated in accordance with the write power setting.

Step S2: It is checked whether the write verify is OK for all processed sectors of the write command or not, or whether, although the failed sector exists, the retry is executed maximally including the write retry and the write verify retry or not. If this condition is fulfilled, the process proceeds to step S3; and otherwise, the process returns to the main routine of FIG. 9.

Step S3: The count value is calculated for the write power learning.

Step S4: It is checked whether the counter exceeds the threshold value (±5000) or not. If exceeding the threshold, the process proceeds to step S5; and if not exceeding, the process returns to the main routine of FIG. 9.

Step S5: The write power learning is executed. In other words, the optimum write condition is calculated for all previously processed sectors and the default write condition is changed to the optimum write condition.

When the default condition is changed for the write power, for example, if the polarity of the final counter value is "minus", the changed default write power is a value obtained by subtracting a predefined value from the default write power. On the other hand, if the polarity of the final counter value is "plus", the changed default write power is a value obtained by adding a predefined value to the default write power. In this way, the default condition is approached to a more optimum condition based on the previous retry history.

Other than adding or subtracting the predefined value in accordance with the polarity of the counter value as describe, the default condition may be changed by multiplying a coefficient not less than 1 in the case of plus or a coefficient less than 1 in the case of minus. Further, the default condition may be changed to the retry contents having the greatest success rate out of the retry write history, which are the write power of mode 2 in this example.

Although, in the above embodiments, the learning process is executed to change the default condition if the learning counter value exceeds a predefined threshold during each of read, write verify and write retry processes, as another embodiment, the default condition may be changed by checking the value of the learning counter at the time of termination of one (1) command and by executing the learning process if the value exceeds the predefined threshold, such that the condition is changed in units of one (1) command.

The present invention is not limited to the above embodiment but encompasses any alteration without impairing the object and the benefit thereof. Also, the present invention is not restricted by the numeric values shown in the above embodiment.

What is claimed is:

1. An optical storage apparatus regenerating data on an optical storage medium using a laser beam and an externally applied magnetic field, comprising:
a read retry processing unit which if regeneration is not performed normally when the data is regenerated from the medium, changes the intensities of the laser beam and of the regeneration magnetic field respectively to prearranged stages to perform the regeneration again; and
a regeneration condition change unit which remembers the regeneration sector number for one (1) command from a higher order host and, when retry occurs, counts the number of the sectors for each stage which can be regenerated at each stage, the regeneration condition change unit providing a coefficient for each stage in advance to thereby change the default regeneration condition by use of the sum of products of the coefficients and the number of the counted regenerable sectors.

2. The optical storage apparatus of claim 1, wherein if a predefined threshold is exceeded by the sum of products of the coefficients and the number of the counted regenerable sectors during retry regeneration of the read retry processing unit, the regeneration condition change unit calculates an optimum regeneration condition for all previously processed sectors and changes the default regeneration condition to the optimum regeneration condition.

3. The optical storage apparatus of claim 1, wherein if a predefined threshold is exceeded by the sum of products of the coefficients and the number of the counted regenerable sectors when regeneration is completed for one (1) command, the regeneration condition change unit calculates an optimum regeneration condition for all sectors processed during one (1) command and changes the default regeneration condition to the optimum regeneration condition.

4. An optical storage apparatus recording data on an optical storage medium using a laser beam, comprising:
a write retry processing unit which if the recording is not performed normally when the data is recorded on the optical storage medium, changes the writing intensity of the laser beam to prearranged stages to perform the write again; and
a recording condition change unit which remembers the recording sector number for one (1) command from a higher order host and, when retry occurs, counts the number of the sectors for each stage which can be recorded at each stage, the recording condition change unit providing a coefficient for each stage in advance to thereby change the default recording condition by use of the sum of products of the coefficients and the number of the counted recordable sectors.

5. The optical storage apparatus of claim 4, wherein in the case that the data is recorded on the optical storage medium by applying an external magnetic field in concurrence with the laser beam, if a predefined threshold is exceeded by the sum of products of the coefficients and the number of the counted recordable sectors during the recording retry of the write retry processing unit, the recording condition change unit calculates an optimum recording condition for all previously processed sectors and changes the default recording condition to the optimum recording condition.

6. The optical storage apparatus of claim 4, wherein if a predefined threshold is exceeded by the sum of products of the coefficients and the number of the counted recordable sectors when the recording is completed for one (1) command, the recording condition change unit calculates an optimum recording condition for all sectors processed during one (1) command and changes the default recording condition to the optimum recording condition.

7. An optical storage apparatus recording data on an optical storage medium using a laser beam and an externally applied magnetic field, comprising:
a verify retry processing unit which if regeneration is not performed normally when the verify regeneration is performed after the data is written on the medium, changes the intensities of the laser beam and of the regeneration magnetic field respectively to prearranged stages to perform the verify again; and
a verify condition change unit which remembers the recording sector number for one (1) command from a higher order host and, when retry occurs in the verify regeneration, counts the number of the sectors for each stage which can be regenerated at each stage, the verify condition change unit providing a coefficient for each stage in advance to thereby change the default verify condition by use of the sum of products of the coefficients and the number of the counted regenerable sectors.

8. The optical storage apparatus of claim 7, wherein if a predefined threshold is exceeded by the sum of products of the coefficients and the number of the counted regenerable sectors during the verify retry of the verify retry processing unit, the verify condition change unit calculates an optimum verify condition for all previously processed sectors and changes the default verify condition to the optimum verify condition.

9. The optical storage apparatus of claim 7, wherein if a predefined threshold is exceeded by the sum of products of the coefficients and the number of the counted regenerable sectors during the verify retry of the verify retry processing unit when the verify is completed for one (1) command, the verify condition change unit calculates an optimum verify condition for all sectors processed during one (1) command and changes the default verify condition to the optimum verify condition.

10. A regeneration method of an optical storage medium for regenerating data using a laser beam and an externally applied magnetic field, comprising:
   a read retry processing step of, if regeneration is not performed normally when the data is regenerated from the medium, changing the intensities of the laser beam and of the regeneration magnetic field respectively to prearranged stages to perform the regeneration again; and
   a regeneration condition change step of remembering the regeneration sector number for one (1) command from a higher order host and, when retry occurs, counting the number of the sectors for each stage which can be regenerated at each stage, the regeneration condition change step providing a coefficient for each stage in advance, thereby changing the default regeneration condition by use of the sum of products of the coefficients and the number of the counted regenerable sectors.

11. The regeneration method of an optical storage medium of claim 10, wherein the regeneration condition change step includes, if a predefined threshold is exceeded by the sum of products of the coefficients and the number of the counted regenerable sectors during regeneration retry of the read retry processing step, calculating an optimum regeneration condition for all previously processed sectors and changing the default regeneration condition to the optimum regeneration condition.

12. The regeneration method of an optical storage medium of claim 10, wherein the regeneration condition change step includes, if a predefined threshold is exceeded by the sum of products of the coefficients and the number of the counted regenerable sectors when the regeneration is completed for one (1) command, calculating an optimum regeneration condition for all sectors processed during one (1) command and changing the default regeneration condition to the optimum regeneration condition.

13. A recording method of an optical storage medium for recording data using a laser beam, comprising:
   a write retry processing step of, if the recording is not performed normally when the data is recorded on the optical storage medium, changing the writing intensity of the laser beam to prearranged stages to perform the write again; and
   a recording condition change step of remembering the recording sector number for one (1) command from a higher order host and, when retry occurs, counting the number of the sectors for each stage which can be recorded at each stage, the recording condition change step providing a coefficient for each stage in advance, thereby changing the default recording condition by use of the sum of products of the coefficients and the number of the counted recordable sectors.

14. The recording method of an optical storage medium of claim 13, wherein in the case that the data is recorded on the optical storage medium by applying an external magnetic field in concurrence with the laser beam, the recording condition change step includes, if a predefined threshold is exceeded by the sum of products of the coefficients and the number of the counted recordable sectors during the recording retry of the write retry processing step, calculating an optimum recording condition for all previously processed sectors and changing the default recording condition to the optimum recording condition.

15. The recording method of an optical storage medium of claim 13, wherein the recording condition change step includes, if a predefined threshold is exceeded by the sum of products of the coefficients and the number of the counted regenerable sectors when the recording is completed for one (1) command, calculating an optimum recording condition for all sectors processed during one (1) command and changing the default recording condition to the optimum recording condition.

16. A recording method of an optical storage medium for recording data using a laser beam and an externally applied magnetic field, comprising:
   a verify retry processing step of, if regeneration is not performed normally when the verify regeneration is performed after the data is written on the medium, changing the intensities of the laser beam and of the regeneration magnetic field respectively to prearranged stages to perform the verify again; and
   a verify condition change step of remembering the recording sector number for one (1) command from a the higher order host and, when retry occurs in the verify regeneration, counting the number of the sectors for each stage which can be regenerated at each stage, the verify condition change step providing a coefficient for each stage in advance, thereby changing the default verify condition by use of the sum of products of the coefficients and the number of the counted regenerable sectors.

17. The recording method of an optical storage medium of claim 16, wherein the verify condition change step includes, if a predefined threshold is exceeded by the sum of products of the coefficients and the number of the counted regenerable sectors during the verify retry of the verify retry processing step, calculating an optimum verify condition for all previously processed sectors and changing the default verify condition to the optimum verify condition.

18. The recording method of an optical storage medium of claim 16, wherein the verify condition change step includes, if a predefined threshold is exceeded by the sum of products of the coefficients and the number of the counted regenerable sectors when the verify is completed for one (1) command, calculating an optimum verify condition for all sectors processed during one (1) command and changing the default verify condition to the optimum verify condition.

* * * * *